United States Patent
Kawamoto et al.

(10) Patent No.: US 12,154,093 B2
(45) Date of Patent: Nov. 26, 2024

(54) SHOPPING SUPPORT APPARATUS AND SHOPPING SUPPORT METHOD

(71) Applicant: TOSHIBA TEC KABUSHIKI KAISHA, Tokyo (JP)

(72) Inventors: Tsuyoshi Kawamoto, Nerima Tokyo (JP); Fumio Nakatsukasa, Yokohama Kanagawa (JP); Mikio Ito, Ota Tokyo (JP); Kiyomitu Yamaguchi, Izunokuni Shizuoka (JP); Shigeki Nimiya, Yokohama Kanagawa (JP); Takuya Haketa, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 936 days.

(21) Appl. No.: 17/076,396

(22) Filed: Oct. 21, 2020

(65) Prior Publication Data
US 2021/0241259 A1    Aug. 5, 2021

(30) Foreign Application Priority Data
Feb. 5, 2020 (JP) .................................. 2020-017708

(51) Int. Cl.
*G06Q 20/32* (2012.01)
*G06K 7/14* (2006.01)
(Continued)

(52) U.S. Cl.
CPC ....... *G06Q 20/3276* (2013.01); *G06K 7/1417* (2013.01); *G06Q 20/346* (2013.01);
(Continued)

(58) Field of Classification Search
CPC ............. G06Q 20/202; G06Q 20/3274; G06Q 20/326; G06Q 20/3224; G06Q 30/02; G06Q 20/36; G06Q 20/204
(Continued)

(56) References Cited

U.S. PATENT DOCUMENTS

2012/0253913 A1* 10/2012 Richard ............. G06Q 20/3278
                                                    705/14.27
2013/0085834 A1*  4/2013 Witherspoon, Jr. ... G06Q 30/02
                                                    705/14.1
(Continued)

FOREIGN PATENT DOCUMENTS

JP    2008-20991 A    1/2008
JP    2015-049636 A    3/2015
(Continued)

OTHER PUBLICATIONS

Notice of Reasons for Refusal mailed May 25, 2021, in corresponding Japanese Patent Application No. 2020-017708, 6 pages (with Translation).
(Continued)

*Primary Examiner* — Olusegun Goyea
(74) *Attorney, Agent, or Firm* — Kim & Stewart LLP

(57) ABSTRACT

In accordance with an embodiment, a shopping support apparatus includes a reader, a memory, and a processor. The processor causes the reader to read a data code, obtains store-specific setting information, and causes the memory to store control mode information included in the obtained setting information. The processor determines, on the basis of the control mode information of the setting information stored in the memory, whether to set a first mode for shopping support at the store as the control mode of the processor or set a second mode for a task restricted to an operation of an authorized person as the control mode of the processor.

9 Claims, 29 Drawing Sheets

(51) Int. Cl.
*G06Q 20/34* (2012.01)
*G06Q 30/0601* (2023.01)
*G06Q 20/20* (2012.01)
*G06Q 30/018* (2023.01)
*H02J 7/00* (2006.01)

(52) U.S. Cl.
CPC ..... *G06Q 30/0607* (2013.01); *G06Q 30/0613* (2013.01); *G06Q 20/201* (2013.01); *G06Q 20/202* (2013.01); *G06Q 20/203* (2013.01); *G06Q 20/208* (2013.01); *G06Q 20/326* (2020.05); *G06Q 30/0185* (2013.01); *H02J 7/0048* (2020.01)

(58) Field of Classification Search
USPC .............. 705/14.1, 14.27, 14.32, 17, 41
See application file for complete search history.

(56) References Cited

U.S. PATENT DOCUMENTS

| | | | |
|---|---|---|---|
| 2014/0019352 A1* | 1/2014 | Shrivastava | G06Q 20/326 705/41 |
| 2016/0267565 A1* | 9/2016 | Katcher | G06Q 30/0613 |
| 2017/0200162 A1* | 7/2017 | Pourfallah | G06Q 20/326 |
| 2018/0068291 A1 | 3/2018 | Kakino | |
| 2018/0232796 A1* | 8/2018 | Glaser | G06Q 90/20 |
| 2019/0147426 A1* | 5/2019 | Kieffer | G06Q 20/3224 705/17 |
| 2019/0266593 A1* | 8/2019 | de la Cropte de Chanterac | G07F 7/0873 |
| 2020/0074256 A1* | 3/2020 | Koeppel | G06K 19/0702 |
| 2020/0082457 A1* | 3/2020 | Hagemann | G16H 40/20 |
| 2021/0056528 A1* | 2/2021 | Kawamoto | G06Q 20/202 |
| 2021/0056558 A1* | 2/2021 | Nakatsukasa | G06Q 20/425 |
| 2021/0056614 A1* | 2/2021 | Kawamoto | G06Q 20/3276 |
| 2021/0174417 A1* | 6/2021 | Kawamoto | G06F 16/2365 |

FOREIGN PATENT DOCUMENTS

| | | |
|---|---|---|
| JP | 2015-162013 A | 9/2015 |
| JP | 2018-41255 A | 3/2018 |
| JP | 2019-197446 A | 11/2019 |
| JP | 2019-211873 A | 12/2019 |

OTHER PUBLICATIONS

Saji, "Sushiro's self-checkout special feature! Thorough illustration from usage to payment method" Jan. 3, 2020, [Search on May 18, 2021], Internet <URL: https://jouhoukan. net / archives / 6025> (with Machine translation).

Notice of Reasons for Refusal mailed Mar. 28, 2023 in corresponding Japanese Patent Application No. 2021-187765, with Translation (6 pages).

* cited by examiner

| No | SETTING ITEM | SETTING INFORMATION |
|---|---|---|
| 1 | OPERATION VERSION | 1.0.0 |
| 2 | COMPANY CODE | 00001 |
| 3 | STORE CODE | 00001 |
| 4 | COMPANY NAME | XXX |
| 5 | STORE NAME | AAA |
| 6 | STORE ENTRY FLAG | 1or0 |
| 7 | IP ADDRESS | 111.222.1.1:9999 |
| 8 | CLOUD DOMAIN NAME | cloudname.jp |
| 9 | ELECTRONIC RECEIPT SERVER ADDRESS | www.receipt.jp |
| 10 | STORE LAN FLAG | 1or0 |
| 11 | STORE LAN-SSID | Store.nnn |
| 12 | STORE LAN-PASSWORD | 1234567890 |
| 13 | STORE LAN-SECURITY SYSTEM | 1or2or3 |
| 14 | CLOUD MANDATORY FLAG | 1or0 |
| 15 | STATUS TRANSMISSION MODE | 1or2or3 |
| 16 | LOG TRANSMISSION MODE | 1or2or3 |
| 17 | FTP-HOST NAME | 111.222.1.1 |
| 18 | FTP-USER NAME | ftpuser |
| 19 | FTP-PASSWORD | ftppass |
| 20 | FTP-LOG FOLDER PATH | c:¥log¥ |
| 21 | UPC CHECK DIGIT DELETION FLAG | 1or0 |
| 22 | CAMERA AUTOMATIC TRANSITION TIME | 30000ms |
| 23 | MOBILE COMMUNICATION TIME-OUT TIME | 2000ms |
| 24 | NUMBER OF RETRIES OF MOBILE COMMUNICATION | 1 |
| 25 | CLOUD COMMUNICATION TIME-OUT TIME | 3000ms |
| 26 | NUMBER OF RETRIES OF CLOUD COMMUNICATION | 1 |
| 27 | VALUE OF STORE CLERK VERIFICATION WARNING-CANCELLING BARCODE | 0123456789 |
| 28 | OPERATION MODE | 1or2 |
| 29 | ACCOUNTING MACHINE TRANSFER MODE | 1or2 |
| 30 | MOBILE PAYMENT FLAG | 1or0 |
| 31 | R-20 PRODUCT FORCE FLAG | 1or0 |
| 32 | POINT CARD INPUT MODE | 1or2 |
| 33 | AUTHORIZED PERSON MODE FLAG | 1or0 |
| 34 | BATTERY CHECK THRESHOLD | 20 |

Fig.4

| PROGRAM ID | COMPANY CODE | STORE CODE | STORE ENTRY DATE AND TIME | STORE EXIT DATE AND TIME |
|---|---|---|---|---|
| | | | | |
| | | | | |
| | | | | |
| | | | | |
| ... | ... | ... | ... | ... |

Fig.6

SHOPPING SUPPORT APPARATUS AND SHOPPING SUPPORT METHOD

CROSS-REFERENCE TO RELATED APPLICATION

This application is based upon and claims the benefit of priority from the prior Japanese Patent Application No. 2020-017708, filed on Feb. 5, 2020, the entire contents of which are incorporated herein by reference.

FIELD

An embodiment described here generally relates to a shopping support apparatus and a shopping support method.

BACKGROUND

Shopping support systems are already known in which a consumer can self-register a purchased commodity by operating a shopping support apparatus himself or herself to cause the shopping support apparatus to read a commodity code for identifying the commodity when purchasing the commodity at a sales floor.

In this type of shopping support system, a store generally lends a terminal capable of reading a commodity code to a consumer as a shopping support apparatus. For example, a store lends a shopping cart to a consumer by attaching a terminal as a shopping support apparatus to the shopping cart.

On the other hand, in recent years, it has been considered that a communication terminal such as a smartphone, which is individually owned by a consumer, is used as a shopping support apparatus. The use of privately owned telecommunication terminals as shopping support apparatuses has the advantage of saving initial capital investment for stores. Consumers also have the advantage of good operability because they can self-register purchased commodities using the same communication terminal at a plurality of stores.

Furthermore, electronic payments using smartphones, or so-called mobile payments, have become popular in recent years. As a result, it has become possible for the consumer to complete the processing from registration to payment of the purchased commodity with the communication terminal owned by the consumer. However, many stores offer a service that issues point cards (reward cards) to consumers and grants reward points when customers visit stores. When the registration to the payment of the commodity is completed by the communication terminal owned by the consumer, there is no opportunity to give reward points. It is presumed that such inconvenience is overcome by setting a card number or the like of the point card in the communication terminal. However, if the consumer can set the information of the point card by himself/herself to the communication terminal, since reward points are given without the substance of the point card thereafter, fraud such as setting of an imaginary card number becomes possible. Therefore, the operation of setting the information of the point card to the communication terminal needs to be restricted to the authorized person such as a store clerk.

BRIEF DESCRIPTION OF THE DRAWINGS

FIG. 4 is a schematic diagram showing a data structure of a store setting table.

FIG. 6 is a schematic diagram showing a main data structure of a history file.

DETAILED DESCRIPTION

Figure 1:
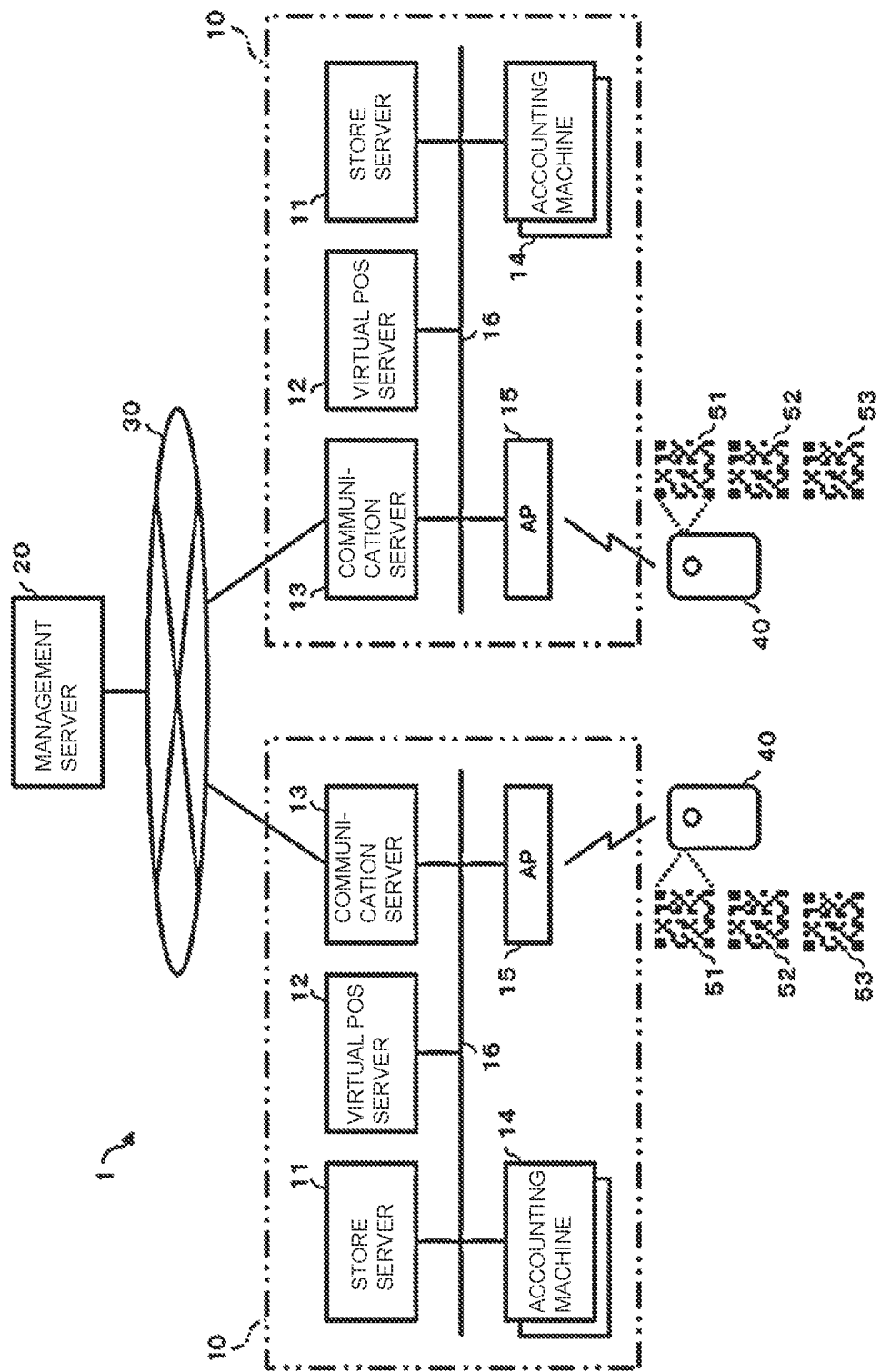
FIG. 1 is a block diagram showing a schematic configuration of a shopping support system according to an embodiment.

In accordance with one embodiment, a shopping support apparatus performs a support operation of shopping at a store when a consumer performs shopping at the store. The shopping support apparatus includes includes a reader, a memory, and a processor. The reader reads a data code indicating store-specific setting information. The memory stores the store-specific setting information. The processor causes the reader to read the data code and obtaining the store-specific setting information. The processor analyzes the obtained store-specific setting information and causing the memory to store the control mode information included in the setting information. Moreover, the processor determines, on the basis of the control mode information of the setting information stored in the memory, whether to set a first mode for shopping support at the store as the control mode of the processor or set a second mode for a task restricted to an operation of an authorized person as the control mode of the processor.

Hereinafter, an embodiment of the shopping support apparatus and the shopping support method will be described with reference to the drawings. In the drawings, identical symbols denote identical or similar parts.

It should be noted that in this embodiment, a case where a communication terminal such as a smartphone owned by a consumer is used as a shopping support apparatus of a shopping support system introduced in a plurality of stores will be described.

FIG. 1 is a block diagram showing a schematic configuration of a shopping support system 1 according to this embodiment. The shopping support system 1 includes a plurality of store systems 10, a management server 20, a network 30, and a shopping support apparatus 40.

The store system 10 is configured for each store to which the shopping support system 1 is introduced. The number of stores is not particularly limited. FIG. 1 shows a store system 10 configured in a store AAA and a store system 10 configured in a store BBB. It should be noted that the company operating the store AAA may be the same as or different from the company operating the store BBB.

The basic configuration of the store system 10 is common. That is, as shown in FIG. 1, the store system 10 includes a store server 11, a virtual POS server 12, a communication server 13, an accounting machine 14, and an access point 15, which are connected through a wired local area network (LAN) 16.

The store server 11 is a computer that supports the general store business. For the support, the store server 11 manages a variety of databases including a commodity database. The commodity database is a collection of commodity records writing data of each commodity sold in the store. That is, the commodity database managed by the store server 11 of the store AAA stores a commodity record relating to each commodity sold in the store AAA. The commodity database managed by the store server 11 of the store BBB stores a commodity record relating to each commodity sold in the store BBB. The commodity record includes commodity data such as a commodity code, a price, and a commodity name. The commodity code is a unique identification code set for each commodity to individually identify the commodity. Each commodity is typically accompanied by a barcode representing the commodity code.

The virtual POS server 12 is a computer that, in cooperation with the shopping support apparatus 40, provides support for making it appear as if a well-known POS terminal is operating. The virtual POS server 12 has the following three functions. The first function is a function of registering sales data of a commodity identified by a commodity code input via the shopping support apparatus 40 for identification information of each shopping support apparatus 40. In each shopping support apparatus 40, unique identification information is set to identify each other. The second function is a a function of generating registration screen on the basis of sales data of each commodity registered for identification information of each shopping support apparatus 40 and displaying the registration screen on a display device of the shopping support apparatus 40 specified by the identification information. The third function is a function of, when accounting is instructed from the shopping support apparatus 40, generating accounting data on the basis of sales data of each commodity registered for identification information of each shopping support apparatus 40, and transmitting the check-out data to the store server 11.

The communication server 13 is a server for supporting data communication with the management server 20 connected via the network 30.

The accounting machine 14 is a terminal for paying for a purchased commodity. The accounting machine 14 obtains accounting data from the store server 11 and performs payment on the basis of the accounting data. The method of payment is not particularly limited. The store system 10 can use a well-known payment method such as cash payment, credit card payment, electronic money payment, point payment, and mobile payment.

The accounting machine 14 may have a function of registering purchased commodities. For example, when the barcode of the purchased commodity is read by a scanner connected to the accounting machine 14, the accounting machine 14 makes an inquiry to the store server 11 with the commodity code included in the barcode. As a result of this inquiry, the commodity data such as the commodity name and price of the commodity identified by the commodity code is returned from the store server 11, and the accounting machine 14 registers the sales data of the purchased commodity on the basis of the commodity data. Then, the accounting machine 14 performs payment for the purchased commodity. Alternatively, the accounting machine 14 adds the sales data of the purchased commodity to the accounting data obtained from the store server 11 and performs payment.

Such an accounting machine 14 includes a cashier-staffed accounting machine in which a store clerk inputs information for payment and a self-accounting machine in which a consumer inputs information for payment. The store system 10 may include both the cashier-staffed accounting machine and the self-accounting machine or may be either one of the cashier-staffed check-out machine or the self-accounting machine. A well-known POS terminal can be employed as the cashier-staffed accounting machine. A well-known self-accounting machine or semi-self-accounting machine can be employed as the self-accounting method.

The access point 15 is a communication facility installed in the store as a relay base when each server (the store server 11, the virtual POS server 12, the communication server 13, or the like) of the store system 10 performs data communication with the shopping support apparatus 40 through a wireless LAN. The wireless LAN conforms to, for example, Wi-Fi (registered trademark) standards. It should be noted that in FIG. 1, only one access point 15 is shown in one store system 10, but the number of access points 15 is not limited. A plurality of access points 15 may be connected to the wired LAN 16 depending on the size of the store or the like.

The management server 20 is a cloud computing server that provides services through a communication network such as the Internet. The management server 20 is connected to the communication server 13 of the store system 10 through the network 30. The network 30 is, for example, a wide area network (WAN) using a virtual private network (VPN). The management server 20 can be connected to the shopping support apparatus 40 via a WAN such as the Internet and a mobile communication network. Thus, the management server 20 also has a function of relaying data communication between the shopping support apparatus 40 in the connected state and the store system 10.

The shopping support apparatus 40 is a portable communication terminal commonly used when a consumer uses the shopping support system 1 at a plurality of stores. The shopping support apparatus 40 has hardware for reading at least data codes 51, 52, and 53 in a two-dimensional code system as will be described in detail later. For example, a commercially available smartphone equipped with a digital camera, a tablet terminal, or the like can be used as the shopping apparatus 40. In this embodiment, a communication terminal personally owned by a consumer is used as the shopping support apparatus 40.

The data codes 51, 52, and 53 are prepared for each store. The data code 51 is prepared at the entrance of each store. The data code 52 is prepared at the exit of each store. The data code 53 is prepared in, for example, a service counter of a store. Typically, the service counter has a store clerk in charge of customer service. The data code 53 is prepared in a place that only the store clerk can reach. In other words, the data code 53 is not provided in a place that consumers can reach. The data code 51 and the data code 52 other than the data code 53 are prepared in places that consumers who have visited the shop can reach. Hereinafter, the data code 51 will be referred to as a store entry data code 51. The data code 52 will be referred to as a store exit data code 52. The data code 53 will be referred to as a store setting data code 53.

Each of the store entry data code 51, the store exit data code 52, and the store setting data code 53 is obtained by coding setting information specific to a store or a company operating the store in a predetermined two-dimensional code system. Items of setting information are common regardless of store. The information of each item differs depending on the store. The items of setting information will be described later.

Figure 2:
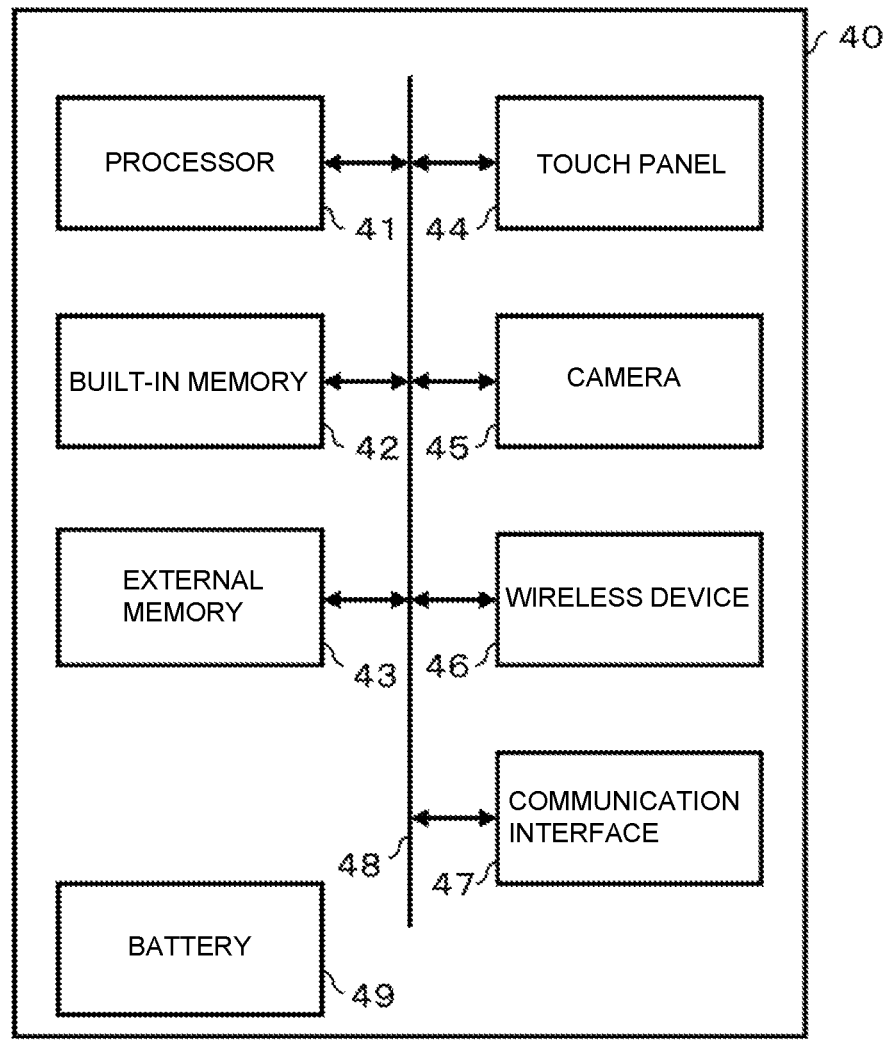
FIG. 2 is a block diagram showing a main circuit configuration of the shopping support apparatus.

FIG. 2 is a block diagram showing a main circuit configuration of the shopping support apparatus 40. As shown in FIG. 2, the shopping support apparatus 40 includes a processor 41, a built-in memory 42, an external memory 43, a touch panel 44, a camera 45, a wireless device 46, a communication interface (I/F) 47, and a system transmission path 48. The shopping support apparatus 40 further includes a rechargeable battery 49 as a driving source.

The system transmission path 48 includes an address bus, a data bus, a control signal line, and the like. In the shopping support apparatus 40, the processor 41, the built-in memory 42, the external memory 43, the touch panel 44, the camera 45, the wireless device 46, and the communication interface 47 are connected to the system transmission path 48. In the shopping support apparatus 40, a computer is configured by the processor 41, the built-in memory 42, the external memory 43, and the system transmission path 48 connecting them.

The processor 41 corresponds to a central portion of the computer. The processor 41 controls each unit to realize various functions as the shopping support apparatus 40 in accordance with an operating system or an application program. The processor 41 is, for example, a central processing unit (CPU).

The built-in memory 42 corresponds to a main storage portion of the computer. The built-in memory 42 includes a non-volatile memory area and a volatile memory area. The built-in memory 42 stores the operating system or application program in the non-volatile memory area. The built-in memory 42 stores data necessary for the processor 41 to perform processing for controlling each unit in the volatile memory area. The built-in memory 42 is used as a work area in which the volatile memory area is rewritten as appropriate by the processor 41. The non-volatile memory area is, for example, a Read only memory (ROM). The volatile memory area is, for example, a random access memory (random access memory).

The external memory 43 corresponds to an auxiliary storage portion of the computer. The external memory 43 is, for example, an SD memory card, a USB memory, or the like. The external memory 43 stores data used by the processor 41 to perform various types of processing, data generated by processing in the processor 41, and the like. The external memory 43 may store the application program described above.

The touch panel 44 is a device including both an input device and a display device of the shopping support apparatus 40. The touch panel 44 detects a touch position with respect to a displayed image and outputs the touch position information to the processor 41.

The camera 45 is an imaging device incorporated in the shopping support apparatus 40. The camera 45 operates as a still image or moving image capturing device or as a scanning device of a data code such as a barcode or a two-dimensional code by an application program installed in the shopping support apparatus 40. The camera 45 is an example of a code reader.

The wireless device 46 is a circuit for performing data communication with the access point 15 in accordance with a wireless LAN communication protocol.

The communication interface 47 is a circuit for performing data communication with the management server 20 connected via the Internet or the mobile communication network.

Figure 3:
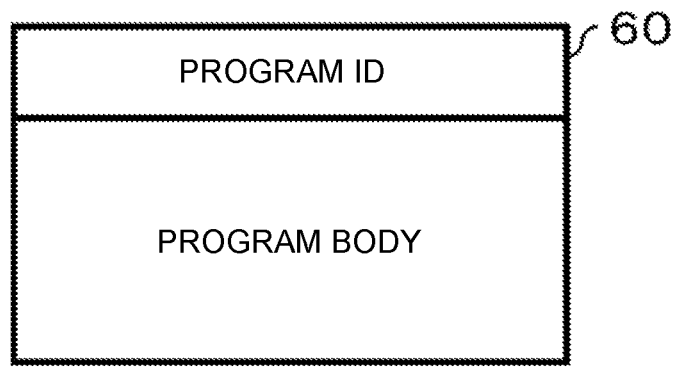
FIG. 3 is a schematic diagram showing a data structure of a shopping support program.

The shopping support apparatus 40 having such a configuration stores a shopping support program 60 (see FIG. 3). The shopping support program 60 is an application program executed on the shopping support apparatus 40 when shopping by a consumer in the store AAA or the store BBB to which the shopping support system 1 is introduced.

FIG. 3 is a schematic diagram showing a data structure of the shopping support program 60. As shown in FIG. 3, the shopping support program 60 includes a program ID and a program body. The program ID is unique identification information set for each program for individually identifying the shopping support program 60 of each shopping support apparatus 40. The program ID also functions as identification information of the shopping support apparatus 40.

The shopping support program 60 is installed in the built-in memory 42 or the external memory 43. The method of installing the shopping support program 60 in the built-in memory 42 or the external memory 43 is not particularly limited. The shopping support program 60 may be distributed by recording the shopping support program 60 on a removable recording medium or by communication over a network, and the shopping support program 60 may be installed in the built-in memory 42 or the external memory 43. Any form of the recording medium can be employed as long as it can store a program and can be read by the apparatus like an SD memory card, a USB memory, or the like.

Further, the shopping support apparatus 40 includes a store setting table 70 (see FIG. 4) as a data table to be referred to when the processor 41 performs information processing in accordance with the shopping support program 60. The store setting table 70 is stored in the external memory 43. The store setting table 70 may be stored in the volatile area of the built-in memory 42.

FIG. 4 is a schematic diagram showing a data structure of the store setting table 70. As shown in FIG. 4, the store setting table 70 includes a first field 71 of the serial number, a second field 72 of the setting item, and a third field 73 of the setting information. In the first field 71, serial numbers Nos. 1 to 34 are written. In the second field 72, 34 types of setting items are written in association with each of the serial numbers Nos. 1 to 34. In the third field 73, the data of the setting items associated with the serial numbers Nos. 1 to 34 is selectively written. The data of the setting items is included in the store entry data code 51, the store exit data code 52, and the store setting data code 53. When any of the data codes 51 to 53 is read by the camera 45 of the shopping support apparatus 40, the data of each setting item is written in the third field 73 of the store setting table 70 in the shopping support apparatus 40.

The setting item corresponding to the serial number No. 1 is an operation version. The latest version of the shopping support program 60 is coded in the data codes 51 to 53 of each store.

The setting item corresponding to the serial number No. 2 is a company code. In the data codes 51 to 53 prepared in the store AAA, the company code for identifying the company operating the store AAA is coded. In the data codes 51 to 53 prepared in the store BBB, the company code for identifying the company operating the store BBB is coded.

The setting item corresponding to the serial number No. 3 is a store code. In the data codes 51 to 53 prepared in the store AAA, the store code for identifying the store AAA is coded. In the data codes 51 to 53 prepared in the store BBB, the store code for identifying the store BBB is coded.

The setting item corresponding to the serial number No. 4 is a company name. In the data codes 51 to 53 prepared in the store AAA, the name of the company operating the store AAA is coded. In the data codes 51 to 53 prepared in the store BBB, the name of the company operating the store BBB is coded.

The setting item corresponding to the serial number No. 5 is a store name. In the data codes 51 to 53 prepared in the store AAA, the name of the store AAA is coded. In the data codes 51 to 53 prepared in the store BBB, the name of the store BBB is coded.

In this manner, in the third field 73 of the setting information corresponding to each of the serial numbers Nos. 2 to 5 of the store setting table 70, information for identifying the store where the consumer shops using the shopping support apparatus 40 is set. That is, the data codes 51 to 53 include information for identifying the store where the consumer shops using the shopping support apparatus 40. This type of information is store-specific setting information.

The setting item corresponding to the serial number No. 6 is a store entry flag. The store entry flag is 1-bit data for identifying whether it is the store entry data code 51 or the store exit data code 52. In this embodiment, "1" is coded as the store entry flag in the store entry data code 51. In the store exit data code 52, "0" is coded as the store entry flag. It should be noted that in the store setting data code 53, "1" is coded as the store entry flag.

The setting item corresponding to the serial number No. 7 is an IP address. The IP address of the communication server 13 provided in the store AAA is coded in the data codes 51 to 53 prepared in the store AAA. The IP address of the virtual POS server 12 provided in the store BBB is coded in the data codes 51 to 53 prepared in the store BBB.

The setting item corresponding to serial number No. 8 is a cloud domain name. The domain name of the management server 20 is coded in each of the data codes 51 to 53 of each store.

The setting item corresponding to the serial number No. 9 is an electronic receipt server address. The electronic receipt server is a server specialized in services that provide electronic receipts obtained by digitalizing receipts to consumers' terminals. The network address of the electronic receipt server used by the store AAA is coded in the data codes 51 to 53 prepared in the store AAA. The network address of the electronic receipt server used by the store BBB is coded in the data codes 51 to 53 prepared in the store BBB.

The setting item corresponding to the serial number No. 10 is a store LAN flag. The store LAN flag is 1-bit data for identifying whether or not to use the wireless LAN in the store as the communication medium between the shopping support apparatus 40 and the store system 10. Hereinafter, the wireless LAN in the store will be referred to as a store LAN. In this embodiment, "1" is coded as the store LAN flag in the data codes 51 to 53 of a store using the store LAN as the communication medium between the shopping support apparatus 40 and the store system 10. In the data codes 51 to 53 of a store not using the store LAN, "0" is coded as the store LAN flag.

The setting item corresponding to the serial number No. 11 is a store LAN-SSID. In the data codes 51 to 53 prepared in the store AAA, a service set identifier (SSID) which is an identification name of the access point 15 provided in the store AAA is coded. In the data codes 51 to 53 prepared in the store BBB, an SSID of the access point 15 provided in the store BBB is coded.

The setting item corresponding to the serial number No. 12 is a store LAN-password. In the data codes 51 to 53 prepared in the store AAA, a password set in the store LAN of the store AAA is coded. In the data codes 51 to 53 prepared in the store BBB, a password set in the store LAN of the store BBB is coded.

The setting item corresponding to the serial number No. 13 is a store LAN-security system. In the data codes 51 to 53 prepared in the store AAA, data indicating an encryption key of a security system (WPA2-PSK, WPA-PSK, WEP, or the like) set in the store LAN of the store AAA is coded. In the data codes 51 to 53 prepared in the store BBB, data indicating an encryption key of a security system set in the store LAN of the store BBB is coded.

The setting item corresponding to the serial number No. 14 is a cloud mandatory flag. The cloud mandatory flag is 1-bit data for identifying whether to set an error when the shopping support apparatus 40 fails to connect to the management server 20 or to continue the use without setting an error. In this embodiment, "1" is coded as the cloud mandatory flag in the data codes 51 to 53 provided in a store that sets an error. In the data codes 51 to 53 provided in a store that continues the use, "0" is coded as the cloud mandatory flag.

The setting item corresponding to the serial number No. 15 is a status transmission mode. The status transmission mode includes a first mode to transmit a status of the shopping support apparatus 40 to the management server 20, a second mode to transmit the status to the store system 10, and a third mode not to transmit the status. In the data codes 51 to 53 of a store employing the first mode, "1" is coded as the status transmission mode. In the data codes 51 to 53 of a store employing the second mode, "2" is coded as the status transmission mode. In the data codes 51 to 53 of a store employing the third mode, "3" is coded as the status transmission mode.

The setting item corresponding to the serial number No. 16 is a log transmission mode. The log transmission mode includes a first mode to transmit a log file in which log data of the shopping support apparatus 40 is stored only to the management server 20, a second mode to transmit the log data only to the store system 10, a third mode to transmit the log data both the management server 20 and the store system 10, and a fourth mode not to transmit the log data. In the data codes 51 to 53 of a store employing the first mode, "1" is coded as the log transmission mode. In the data codes 51 to 53 of a store employing the second mode, "2" is coded as the log transmission mode. In the data codes 51 to 53 of a store employing the third mode, "3" is coded as the log transmission mode. In the data codes 51 to 53 of a store employing the fourth mode, "4" is coded as the log transmission mode.

The setting item corresponding to the serial number No. 17 is an FTP-host name. When the log transmission mode is the first mode or the third mode, the log file is transmitted to the management server 20 via the Internet. In the data codes 51 to 53, the host name or IP address of the protocol used for transmitting the log file to the management server 20 is coded.

The setting item corresponding to the serial number No. 18 is an FTP-user name. In the data codes 51 to 53, the user name of the protocol used for transmitting the log file to the management server 20 is coded.

The setting item corresponding to the serial number No. 19 is an FTP-password. In the data codes 51 to 53, a password for the protocol used for transmitting log files to the management server 20 is coded.

The setting item corresponding to the serial number No. 20 is an FTP-log folder path. In the data codes 51 to 53, a path name of the log file to be transmitted to the management server 20 via the Internet is coded.

As described above, in the third field 73 of the setting information corresponding to each of the serial numbers Nos. 7 to 20 of the store setting table 70, the parameters necessary for the shopping support apparatus 40 to perform communication are set. That is, the data codes 51 to 53 include the parameters necessary for the shopping support apparatus 40 to perform communication. This type of parameter is store-specific setting information.

The setting item corresponding to the serial number No. 21 is a UPC check digit deletion flag. The UPC check digit deletion flag is 1-bit data for identifying whether or not to delete a check digit of a universal product cord (UPC) code which is a kind of commodity code. In this embodiment, "1" is coded as the UPC check digit deletion flag in the data codes 51 to 53 of a store that deletes the check digit. In this embodiment, "0" is coded as the UPC check digit deletion flag in the data codes 51 to 53 of a store that does not delete the check digit.

The setting item corresponding to the serial number No. 22 is a camera automatic transition time. An automatic transition time of the camera 45 of the shopping support apparatus 40 is set for each store. That is, in the data codes 51 to 53 prepared in the store AAA, the camera automatic transition time set in the store AAA is coded. In the data codes 51 to 53 prepared in the store BBB, the camera automatic transition time set in the store BBB is coded.

The setting item corresponding to the serial number No. 23 is a mobile communication time-out time. A time-out time when the shopping support apparatus 40 communicates with the store system 10 via the wireless LAN is set for each shop. That is, in the data codes 51 to 53 prepared in the store AAA, the mobile communication time-out time set in the store AAA is coded. In the data codes 51 to 53 provided in the store BBB, the mobile communication time-out time set in the store BBB is coded.

The setting item corresponding to the serial number No. 24 is the number of retries of mobile communication. The number of retries when the shopping support apparatus 40 times out for communicating with the store system 10 via the wireless LAN is set for each shop. That is, the number of retries of mobile communication set in the store AAA is coded in the data codes 51 to 53 prepared in the store AAA. The number of retries of mobile communication set in the store BBB is coded in the data codes 51 to 53 prepared in the store BBB.

The field of the setting item corresponding to the serial number No. 25 is a cloud communication time-out time. A time-out time when the shopping support apparatus 40 communicates with the store system 10 through the management server 20 is set for each shop. That is, in the data codes 51 to 53 prepared in the store AAA, the cloud communication time-out time set in the store AAA is coded. In the data codes 51 to 53 prepared in the store BBB, the cloud communication time-out time set in the store BBB is coded.

The setting item corresponding to the serial number No. 26 is the number of retries of cloud communication. The number of retries when the shopping support apparatus 40 times out for communicating with the store system 10 through the management server 20 is set for each shop. That is, the number of retries of cloud communication set in the store AAA is coded in the data codes 51 to 53 prepared in the store AAA. The number of retries of cloud communication set in the store BBB is coded in the data codes 51 to 53 prepared in the store BBB.

The setting item corresponding to the serial number No. 27 is a value of a store clerk verification warning-cancelling barcode. For example, when a consumer purchases an R-20 product such as an alcoholic beverage and tobacco, it is necessary for a store clerk to verify the age of the consumer. The store clerk who has verified the age of the consumer causes the shopping support apparatus 40 to read the store clerk verification warning-cancelling barcode dedicated for the store. In the data codes 51 to 53 prepared in the store AAA, the value of the store clerk verification warning-cancelling barcode used by the store clerk of the store AAA is coded. In the data codes 51 to 53 prepared in the store BBB, the value of the store clerk verification warning-cancelling barcode used by the store clerk of the store BBB is coded.

The setting item corresponding to the serial number No. 28 is an operation mode. The operation mode includes a normal mode to normally operate the shopping support system and a demonstration mode to operate the shopping support system as a demonstration. In the data codes 51 to 53 used on the normal mode, "1" is coded as the operation mode. In the data codes 51 to 53 used on the demonstration mode, "0" is coded as the operation mode.

The setting item corresponding to the serial number No. 29 is an accounting machine transfer mode. In the store system 10, the sales data of the purchased commodity, which is read by the consumer using the shopping support apparatus 40, is registered in the virtual POS server 12. Then, when the consumer instructs to perform the accounting of the purchased commodity from the shopping support apparatus 40, accounting data generated on the basis of the sales data of the purchased commodity registered in the virtual POS server 12 is transferred to the accounting machine 14 via the store server 11. At this time, the method of transferring the accounting data to the accounting machine 14 includes a method using a accounting barcode linked to the accounting data and a method not using the accounting barcode. In the data codes 51 to 53 in a store employs the method using the accounting barcode, "1" is coded as the accounting machine transfer mode. In the data codes 51 to 53 in a store employs the method not using the accounting barcode, "0" is coded as the accounting machine transfer mode.

The setting item corresponding to the serial number No. 30 is a mobile payment flag. Mobile payment is one of the payment purchased commodities. The mobile payment is a method of electronically paying for commodities using a barcode or a two-dimensional code by using the shopping support apparatus 40. The mobile payment flag is 1-bit data for identifying whether or not to employ the mobile payment. In this embodiment, "1" is coded as a mobile payment flag in the data codes 51 to 53 of a store employing the mobile payment. In the data codes 51 to 53 of a store not employing the mobile payment, "0" is coded as the mobile payment flag.

The setting item corresponding to the serial number No. 31 is an R-20 product force flag. Whether or not to permit age-restricted products such as an alcoholic beverage and tobacco, i.e., so-called R-20 products, to be registered using the shopping support apparatus 40 is determined by each store. The R-20 product force flag is 1-bit data for identifying whether or not to permit the R-20 products to be registered using the shopping support apparatus 40. In this embodiment, "1" is coded as the R-20 product force flag in the data codes 51 to 53 of a shop that permits the R-20 products to be registered using in the shopping support apparatus 40. In this embodiment, "0" is coded as the R-20 product force flag in the data codes 51 to 53 of a shop that does not permit the R-20 products to be registered using in the shopping support apparatus 40.

The setting item corresponding to the serial number No. 32 is a point card input mode. The point card input mode includes a first mode to manually input a card number of the point card and a second mode to read a data code printed on the card by the camera 45. In the data codes 51 to 53 of a store employing the first mode, "1" is coded as the point card input mode. In the data codes 51 to 53 of a store employing the second mode, "2" is coded as the point card input mode.

The setting item corresponding to the serial number No. 33 is an authorized person mode flag. For example, consumers are not allowed to do the task of inputting the card number of the point card. An authorized person of the store is allowed to do this task. Therefore, the shopping support apparatus 40 takes, as control modes, a first mode for shopping support in the store and a second mode for a task restricted to an operation by an authorized person.

Hereinafter, the first mode will be referred to as a purchase mode and the second mode will be referred to as an authorized person mode. The authorized person mode flag is 1-bit data for identifying whether to take the purchase mode or the authorized person mode as the control mode. In this embodiment, in data codes to take the purchase mode as the control mode, i.e., the store entry data code 51 and store exit data code 52, "0" is coded as the authorized person mode flag. In a data code to take the authorized person mode as the control mode, i.e., the store setting data code 53, "1" is coded as the authorized person mode flag.

The setting item corresponding to the serial number No. 34 is a battery check threshold. The threshold of the battery capacity is set for each store or company to prevent the shopping support apparatus 40 from running out of battery during shopping. That is, the battery check threshold set by the store AAA is coded in the data codes 51 to 53 prepared by the store AAA. The battery check threshold set by the store BBB is coded in the data codes 51 to 53 prepared in the store BBB.

In this manner, in each field of the serial numbers Nos. 22 to 34 of the store setting table 70, the operation restriction information in the store when the shopping support apparatus 40 is used in the store is set. That is, the data codes 51 to 53 include the operation restriction information of the store when the shopping support apparatus 40 is used in the store. The operation restriction information is store-specific setting information.

Figure 5:
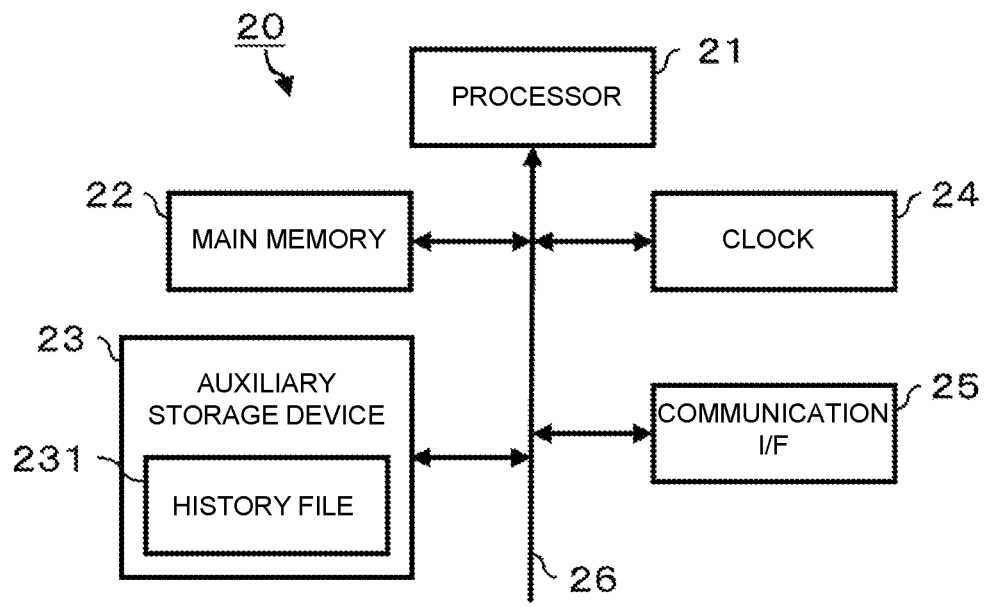
FIG. 5 is a block diagram showing a main circuit configuration of a management server.

FIG. 5 is a block diagram showing a main circuit configuration of the management server 20. The management server 20 includes a processor 21, a main memory 22, an auxiliary storage device 23, a clock 24, a communication interface 25, and a system transmission path 26. The system transmission path 26 includes an address bus, a data bus, a control signal line, and the like. In the management server 20, the processor 21, the main memory 22, the auxiliary storage device 23, the clock 24, and the communication interface 25 are connected to the system transmission path 26. In the management server 20, a computer is configured by the processor 21, the main memory 22, the auxiliary storage device 23, and the system transmission path 26 connecting them.

The processor 21 corresponds to a central portion of the computer. The processor 21 controls each unit to realize various functions as the management server 20 in accordance with an operating system or an application program. The processor 21 is, for example, a CPU.

The main memory 22 corresponds to the main storage portion of the computer. The main memory 22 includes a non-volatile memory area and a volatile memory area. The main memory 22 stores the operating system or application program in the non-volatile memory area. The main memory 22 stores data necessary for the processor 21 to perform processing for controlling each unit in the volatile memory area. The data may be stored in the non-volatile memory area. The main memory 22 uses the volatile memory area as a work area in which data is rewritten as appropriate by the processor 21. The non-volatile memory area is, for example, a ROM. The volatile memory area is, for example, a RAM.

The auxiliary storage device 23 corresponds to an auxiliary storage portion of the computer. The auxiliary storage device 23 is, for example, EEPROM, HDD, SSD, or the like. The auxiliary storage device 23 stores data used by the processor 21 to perform various types of processing, data generated by processing in the processor 21, and the like. The auxiliary storage device 23 may store the application program described above.

The application program stored in the main memory 22 or the auxiliary storage device 23 includes a control program that describes information processing executed by the management server 20. The method of installing the control program in the main memory 22 or the auxiliary storage device 23 is not particularly limited, as is the case with the shopping support program 60.

The clock 24 counts the date and time. The management server 20 obtains the date and time counted by the clock 24 as current date and time.

The communication interface 25 is a circuit for transmitting and receiving data to and from the communication server 13 of each store system 10 connected via the network 30 in accordance with a predetermined communication protocol.

The management server 20 having such a configuration stores a history file 231 in the auxiliary storage device 23. It should be noted that the storage destination of the history file 231 is not limited to the auxiliary storage device 23. The history file 231 may be stored in the volatile memory area of the main memory 22.

FIG. 6 is a schematic diagram showing a main data structure of the history file 231. As shown in FIG. 6, the history file 231 has an area for storing a plurality of records each including a data group of a program ID, a company code, a store code, store entry date and time, and store exit date and time as a single record. The application of the history file 231 will be described later.

Figure 10:
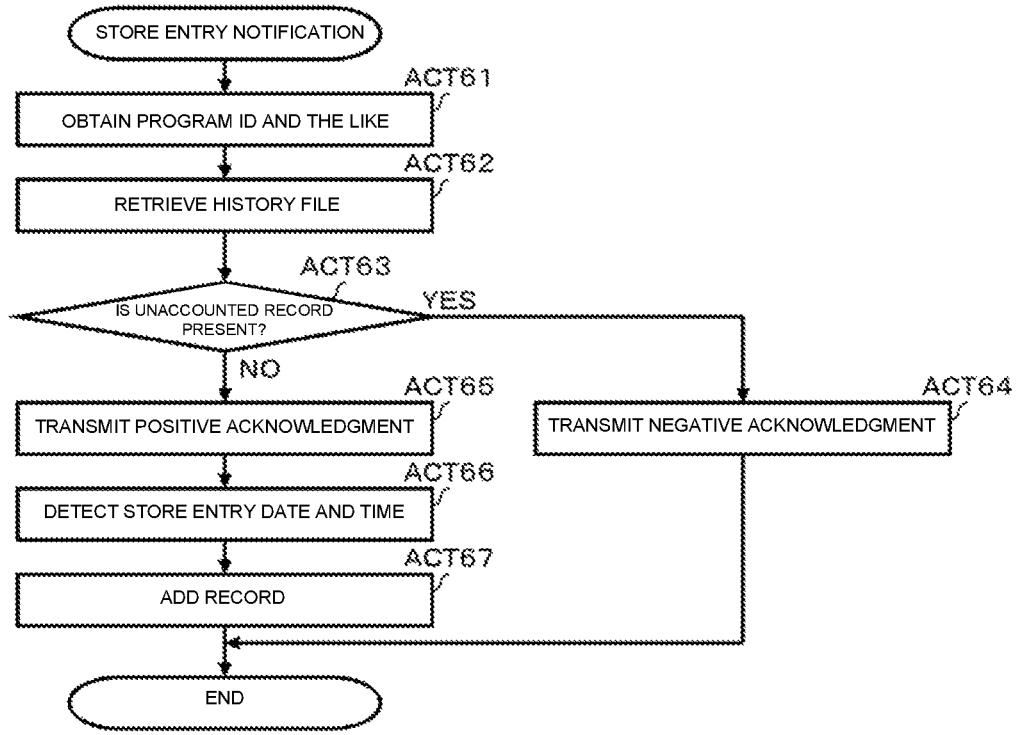
FIG. 10 is a flowchart showing store entry notification command reception processing executed by the processor of the management server.
Figure 11:
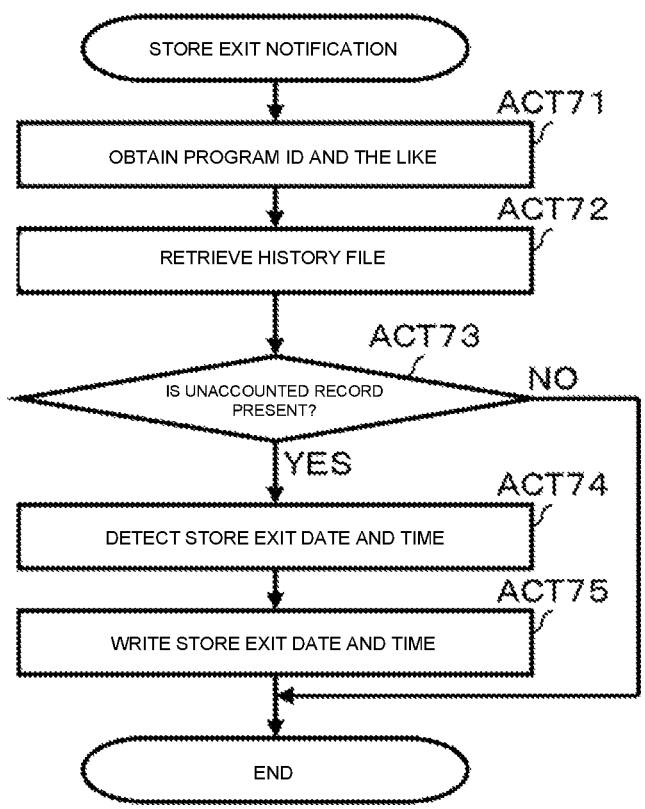
FIG. 11 is a flowchart showing store exit notification command reception processing executed by the processor of the management server.

FIGS. 7 to 9, 12, and 13 are flowcharts each showing information processing executed by the processor 41 of the shopping support apparatus 40 on the basis of the shopping support program 60. FIGS. 10 and 11 are flowcharts each showing command reception processing that the processor 21 of the management server 20 executes in response to receiving a main command from the shopping support apparatus 40. FIGS. 14 to 29 are schematic diagrams showing examples of various screens displayed on the touch panel 44 of the shopping support apparatus 40. Hereinafter, a main operation of the shopping support system 1 will be described with reference to these drawings. It should be noted that the contents of the operation described below is an example. If it is possible to obtain similar results, the operation procedure and the contents are not particularly limited.

First, the consumer installs the shopping support program 60 in a communication terminal such as a smartphone owned by the consumer. By doing so, the communication terminal becomes active as the shopping support apparatus 40.

When the consumer visits the store where the shopping support system 1 is installed, the consumer starts the shopping support program 60 installed in the shopping support apparatus 40 before starting shopping. Then, the processor 41 starts the information processing shown in the flowcharts of FIGS. 7 to 9, 12, and 13.

It should be noted that the shopping support program 60 is not necessarily started by the consumer. For example, a consumer may pass the shopping support apparatus 40 to a store clerk at the service counter and the store clerk may activate the shopping support program 60.

When the shopping support program 60 is activated, the processor 41 displays a check-in screen SCa (see FIG. 14) on the touch panel 44 in ACT 1.

Figure 14:
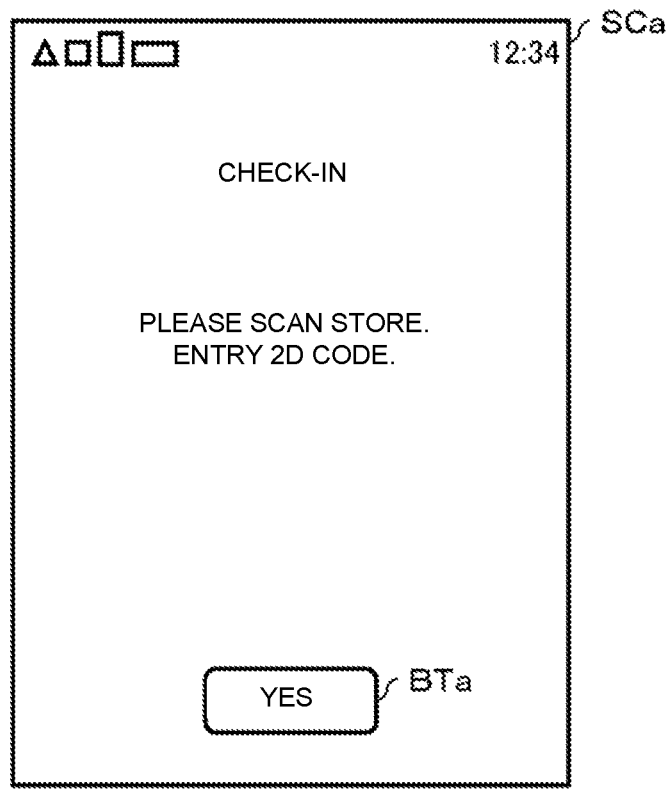
FIG. 14 is a diagram showing an example of a check-in screen.

FIG. 14 shows an example of the check-in screen SCa. As shown in FIG. 14, a message instructing to scan a two-dimensional code for entering the store and an image of a "Yes" button BTa for designating consumer's confirmation of the message are displayed on the check-in screen SCa. The consumer or the store clerk who has confirmed the check-in screen SCa touches the "Yes" button BTa.

In ACT 2, the processor 41 activates the camera 45 when the processor 41 detects that the "Yes" button BTa of the check-in screen SCa has been operated on a basis of a signal from the touch panel 44. In ACT 3, the processor 41 displays a camera screen SCb (see FIG. 15) on the touch panel 44. The camera screen SCb includes a reading area ARa in which an image of a two-dimensional code read by the camera 45 is displayed.

Figure 15:
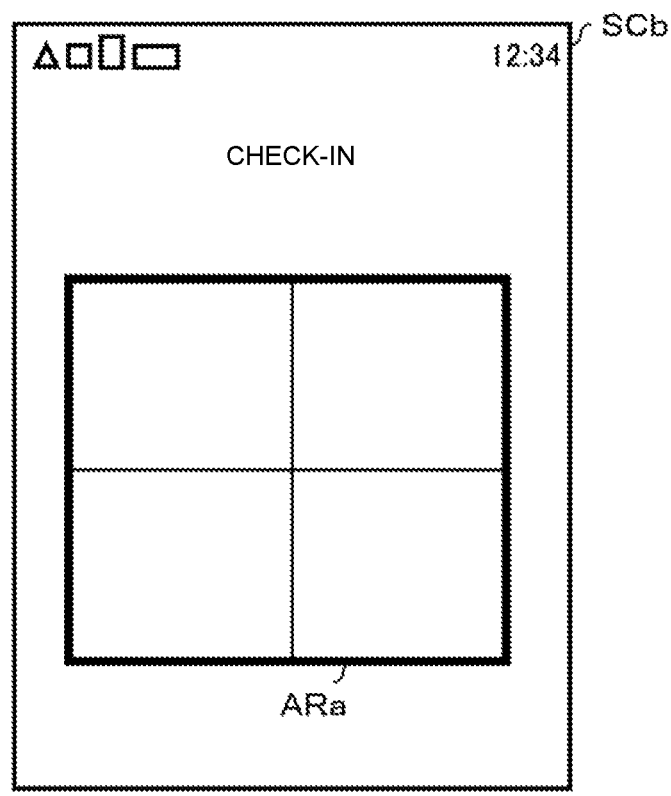
FIG. 15 is a diagram showing an example of a camera screen.

FIG. 15 is an example of the camera screen SCb. As shown in FIG. 15, an image indicating the reading area ARa of the two-dimensional code is displayed on the camera screen SCb. The consumer who has confirmed the camera screen SCb causes the lens of the camera 45 incorporated in the shopping support apparatus 40 to face the store entry data code 51 such that the store entry data code 51 prepared at the entrance of the store falls within the reading area ARa. Alternatively, instead of the consumer, the store clerk causes the lens of the camera 45 incorporated in the shopping support apparatus 40 to face the store entry data code 51 such that the store setting data code 53 prepared at the service counter falls within the reading area ARa.

Figure 16:
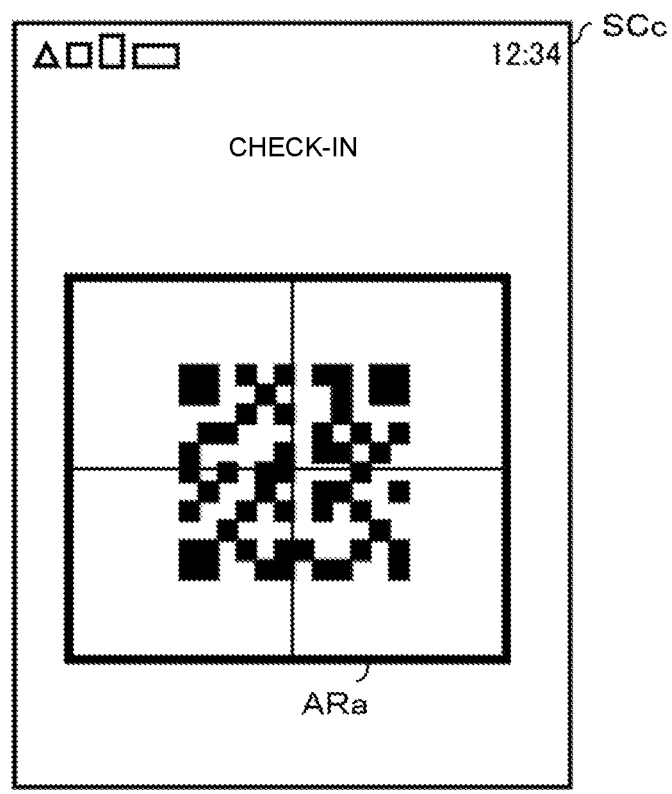
FIG. 16 is a diagram showing an example of a camera screen.

The processor 41 that has displayed the camera screen SCb waits for the data code to be read while determining whether the data code in the two-dimensional code system has been read by the camera 45 in ACT 4. As shown in FIG. 16, when the data code in the two-dimensional code system falls within the reading area ARa, the processor 41 determines that the data code has been read (YES in ACT 4), and the processing of the processor 41 proceeds to ACT 5.

In ACT 5, the processor 41 analyzes the data coded by the data code from the image of the data code captured by the camera 45. In ACT 6, the processor 41 determines whether or not the store entry flag included in the read data code is "1". When the consumer reads the store entry data code 51 or when the store clerk reads the store setting data code 53, since the store entry flag is "1", the processor 41 determines that the store entry flag of the read data code is "1" (YES in ACT 6). However, when the consumer reads the store exit data code 52, since the store entry flag is "0", the processor 41 determines that the store entry flag of the read data code is not "1" (NO in ACT 6).

In a case where it is determined that the store entry flag of the read data code is not "1" (NO in ACT 6), the processing of the processor 41 returns to ACT 4. That is, the processor 41 waits for the data code in the two-dimensional code system to be read by the camera 45.

In a case where it is determined the store entry flag of the read data code is "1" (YES in ACT 6), the processing of the processor 41 proceeds to ACT 7. In other words, in a case where it is determined that the read data code is the store entry data code 51 or the store setting data code 53 (YES in ACT 6), the processing of the processor 41 proceeds to ACT 7. In ACT 7, the processor 41 writes data obtained by analyzing the store entry data code 51 or the store setting data code 53, i.e., the setting information of the setting items corresponding to the serial numbers Nos. 1 to 34, respectively, in the third field 73 of the store setting table 70.

In ACT 8, the processor 41 obtains the data of the third field 73 corresponding to the setting item "battery check threshold" of the serial number No. 34, i.e., the battery check threshold. In ACT 9, the processor 41 then determines whether or not the remaining capacity of the battery 49 mounted in the shopping support apparatus 40 is equal to or larger than the battery check threshold.

In a case where it is determined that the remaining capacity of the battery 49 is less than the battery check threshold (NO in ACT 9), the processing of the processor 41 proceeds to ACT 10. The processor 41 reports a battery error in ACT 10. For example, the processor 41 notifies the consumer that the remaining capacity of the battery 49 is insufficient by causing the touch panel 44 to display a message saying "Battery is low. Please recharge device for preventing it from running out of battery during shopping", for example. After the notification, the processor 41 clears the setting information written in the third field 73 of the store setting table 70 in ACT 11. Thus, the processor 41 terminates the information processing.

Thus, the shopping support apparatus 40 whose remaining battery capacity is less than the battery check threshold cannot be used. In this case, the consumer or the store clerk only needs to recharge the shopping support apparatus 40 or connect an external battery to start the shopping support program 60 again.

In a case where the processor 41 determines that the remaining capacity of the battery 49 is equal to or larger than the battery check threshold (YES in ACT 9), the processing of the processor 41 proceeds to ACT 12. In ACT 12, the processor 41 determines the data of the third field 73 corresponding to the setting item "authorized person mode flag" of the serial number No. 33, i.e., the authorized person mode flag, and determines to set the authorized person mode or the purchase mode as the control mode. When the consumer reads the store entry data code 51 with the camera 45, since the authorized person mode flag is "0", the processor 41 determines to set a mode other than the authorized person mode, i.e., the purchase mode as the control mode (NO in ACT 12). On the other hand, when the store clerk reads the store setting data code 53 with the camera 45, since the authorized person mode flag is "1", the processor 41 determines to set the authorized person mode as the control mode (YES in ACT 12).

In a case where it is determined that the authorized person mode flag is "0" for determining to set the purchase mode as the control mode (NO in ACT 12), the processing of the processor 41 proceeds to ACT 13. The processor 41 performs purchase mode processing in ACT 13. In a case where it is determined that the authorized person mode flag is "0" for determining to set the authorized person mode as the control mode (YES in ACT 12), the processing of the processor 41 proceeds to ACT 13. The processor 41 performs authorized person mode processing in ACT 14. When the purchase mode processing or the authorized person mode processing is completed, the processor 41 terminates the information processing shown in the flowchart of FIG. 7.

Next, the procedures of the purchase mode processing and the authorized person mode processing will be described. First, the purchase mode processing will be described with reference to FIGS. 8 to 11.

When the control mode enters the purchase mode processing, the processor 41 controls the wireless device 46 in ACT 21 and tries to connect to the store LAN according to the various types of data of the setting items "store LAN-SSID", "store LAN-password", and "store LAN-security system" associated with the serial numbers Nos. 11 to 13 of the store setting table 70. At this time, the processor 41 displays a wireless connection screen SCd (see FIG. 17) on the touch panel 44.

Figure 17:
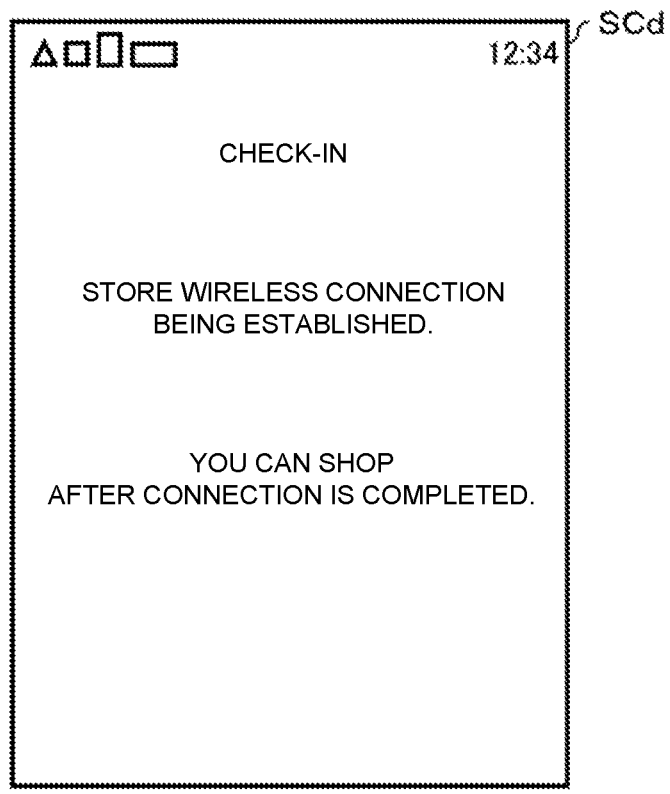
FIG. 17 is a diagram showing an example of a wireless connection screen.

FIG. 17 shows an example of the wireless connection screen SCd. As shown in FIG. 17, a message is displayed on the wireless connection screen SCd indicating that the shopping support apparatus 40 tries to connect to the store LAN and that shopping becomes possible when the connection is completed. The consumer (customer) then waits for the shopping support apparatus 40 to be connected to the store LAN.

Figure 8:
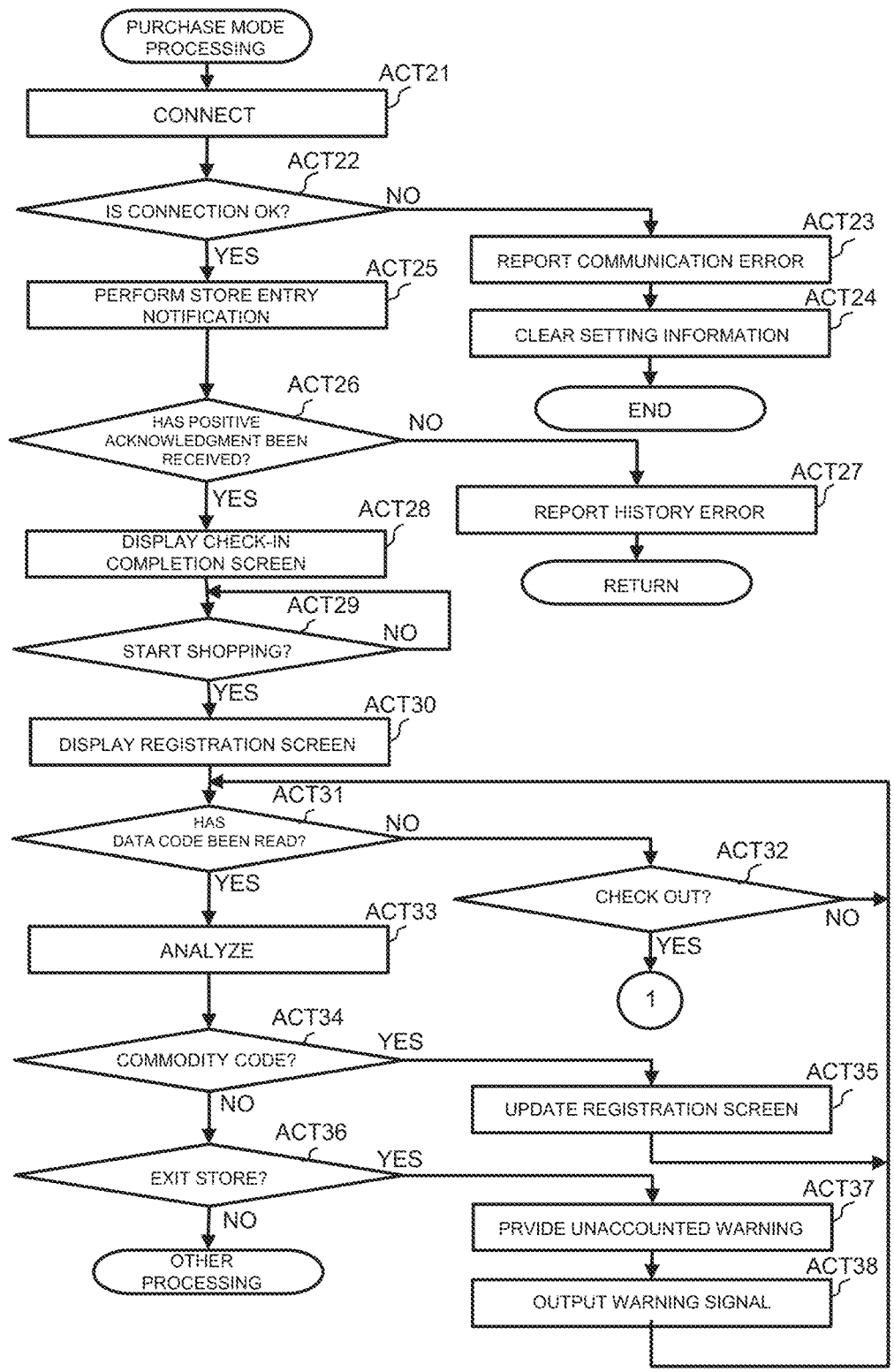
FIG. 8 is a flowchart showing purchase mode processing in FIG. 7.

Now, the description of FIG. 8 will be continued. The processor 41 waits for the shopping support apparatus 40 to be connected to the store LAN while determining whether or not the shopping support apparatus 40 has been connected to the store LAN in ACT 22. Here, when the time corresponding to the setting information of the setting item "mobile communication time-out time" associated with the serial number No. 23 elapses but the shopping support apparatus 40 cannot be connected to the store LAN, the processor 41 repeats the retry a number of times corresponding to the setting information of the setting item "number of retries of mobile communication" associated with the serial number No. 24. In a case where it is determined that the shopping support apparatus 40 cannot be connected to the store LAN even if the retry is repeated a number of times corresponding to the number of retries of mobile communication (NO in ACT 22), the processing of the processor 41 proceeds to ACT 23. In ACT 23, the processor 41 reports a communication error. For example, the processor 41 notifies the consumer that the shopping support apparatus 40 cannot be connected to the store LAN by causing the touch panel 44 to display a message saying "Communication error. Please retry after a while", for example. After the notification, the processor 41 clears the setting information written in the third field 73 of the store setting table 70 in ACT 24. Thus, the processor 41 terminates the purchase mode processing.

In a case where it is determined that the shopping support apparatus 40 has been connected to the store LAN (YES in ACT 22), the processing of the processor 41 proceeds to ACT 25. In ACT 25, the processor 41 controls the wireless device 46 to transmit a store entry notification command to the management server 20. By this control, the store entry notification command is transmitted from the wireless device 46. The store entry notification command is received by the access point 15 via the store LAN, transmitted to the network 30 from the communication server 13, and received by the communication interface 25 of the management server 20. The store entry notification command includes the program ID of the shopping support program 60 and the company code and the store code of the setting information written in the third field 73 of the store setting table 70.

When receiving the store entry notification command via the communication interface 25, the processor 21 of the management server 20 starts store entry notification reception processing shown in the flowchart of FIG. 10. The processor 21 obtains the program ID, the company code, and the store code from the store entry notification command in ACT 61.

The processor 21 retrieves the history file 231 by the use of the program ID in ACT 62. In ACT 63, the processor 21 determines whether or not an unaccounted record is present in the records including the program ID. Specifically, the processor 21 first checks whether or not a record including the program ID is stored in the history file 231. In a case where the record including the program ID is not stored in the history file 231, the processor 21 determines that the unaccounted record is absent.

In a case where the record including the program ID is stored in the history file 231, the processor 21 checks whether or not the store exit date and time are written in the record. In a case where the store exit date and time are written, the processor 21 determines that the unaccounted record is absent. On the other hand, in a case where the store exit date and time are not written, the processor 21 determines that the unaccounted record is present.

In a case where it is determined that the unaccounted record is present (YES in ACT 63), the processing of the processor 21 proceeds to ACT 64. In ACT 64, the processor 21 controls the communication interface 25 to transmit a negative acknowledgment command to the shopping support apparatus 40 that is the store entry notification command source. By this control, the negative acknowledgment command is transmitted from the communication interface 25. The negative acknowledgment command is received by the communication server 13 via the network 30, wirelessly transmitted from the access point 15, and received by the wireless device 46 of the shopping support apparatus 40 that is the store entry notification command source. The processor 21 that has controlled the transmission of the negative acknowledgment terminates the store entry notification reception processing shown in the flowchart of FIG. 10.

On the other hand, in a case where it is determined that the unaccounted record is absent (NO in ACT 63), the processing of the processor 21 proceeds to ACT 65. In ACT 65, the processor 21 controls the communication interface 25 to transmit a positive acknowledgment command to the shopping support apparatus 40 that is the store entry notification command source. By this control, the positive acknowledgment command is transmitted from the communication interface 25. The positive acknowledgment command is received by the communication server 13 via the network 30, wirelessly transmitted from the access point 15, and received by the wireless device 46 of the shopping support apparatus 40 that is the store entry notification command source.

In ACT 66, the processor 21 that has controlled the transmission of the positive acknowledgment command detects the date and time counted by the clock 24 as the store entry date and time. In ACT 67, the processor 21 adds the record including the program ID, the company code, and the store code obtained from the store entry notification command, and the store entry date and time to the history file 231. Thus, the processor 21 terminates the store entry notification reception processing shown in the flowchart of FIG. 10.

In ACT 26, the processor 41 of the shopping support apparatus 40 that has controlled the transmission of the store entry notification command waits a positive acknowledgment command from the management server 20 while determining whether or not the positive acknowledgment command has been received from the management server 20. Here, in a case where it is determined that the negative acknowledgment command has been received (NO in ACT 26), the processing of the processor 41 proceeds to CT27. In ACT 27, the processor 41 reports a history error. For example, the processor 41 displays a history error screen on the touch panel 44 to notify the consumer that an error has occurred in the past history.

It should be noted that in the record stored in the history file 231, the store exit date and time are written when the consumer, who is the user of the shopping support apparatus 40 having installed the shopping support program 60 specified by the program ID of the record, finishes accounting at the store and reads the store exit data code 52 with the camera 45. Therefore, the fact that the record does not include the store exit date and time and that the unaccounted record is present means that the consumer has not completed the accounting at the store visited last time or has forgotten to read the store exit data code 52. For this reason, in the shopping support system 1, the history error is reported to disable the use of the shopping support apparatus 40.

In a case where it is determined that a positive acknowledgment command has been received as the acknowledgment command from the management server 20 (YES in ACT 26), the processing of the processor 41 proceeds to ACT 28. In ACT 28, the processor 41 displays a check-in completion screen SCe (see FIG. 18) on the touch panel 44.

Figure 18:
FIG. 18 is a diagram showing an example of check-in completion screen.

FIG. 18 shows an example of the check-in completion screen SCe. As shown in FIG. 18, a message indicating that it got ready for shopping and an image of a "Yes" button BTb are displayed on the check-in completion screen SCe. The consumer who has confirmed the check-in completion screen SCe touches the "Yes" button BTb.

It should be noted that when the shopping support apparatus 40 has been connected to the store LAN, the store server 11 of the store system 10 obtains the program ID from the shopping support apparatus 40. The store server 11 obtains the data of the setting item "company code" associated with the serial number No. 2 of the store setting table 70 included in the shopping support apparatus 40 and the data of the setting item "store code" associated with the serial number No. 3. Then, the store server 11 checks whether or not the preset company code and store code match the data of the "company code" and the "store code" obtained from the shopping support apparatus 40. In a case where they match, the store server 11 notifies the virtual POS server 12 of the program ID of the shopping support apparatus 40. The virtual POS server 12 generates a commodity registration table in which the program ID notified from the store server 11 is set. The store server 11 wirelessly transmits a check-in completion command to the shopping support apparatus 40. In response to the check-in completion command, the processor 41 of the shopping support apparatus 40 displays the check-in completion screen SCe on the touch panel 44.

The processor 41 that has controlled the display of the check-in completion screen SCe waits for an instruction to start shopping while detecting whether or not the "Yes" button BTb of the check-in completion screen SCe has been operated on the basis of a signal from the touch panel 44 in ACT 29. When the processor 41 detects that the "Yes" button BTb of the check-in completion screen SCe has been operated by a signal from the touch panel 44, the processor 41 determines that the shopping start has been instructed. In a case where it is determined that the shopping start has been instructed (YES in ACT 29), the processing of the processor 41 proceeds to ACT 30. In ACT 30, the processor 41 displays a registration screen SCf (see FIG. 19) on the touch panel 44.

Figure 19:
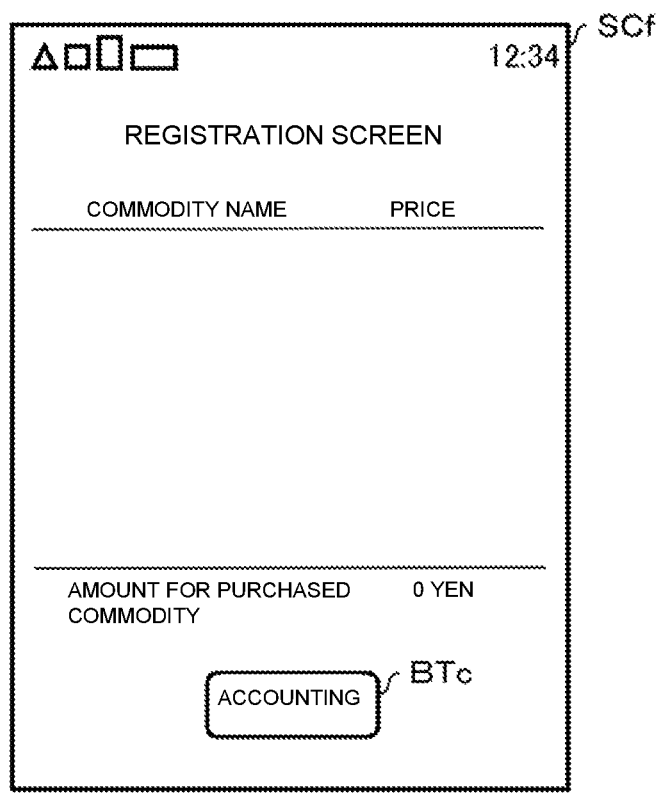
FIG. 19 is a diagram showing an example of a registration screen.

FIG. 19 shows an example of the registration screen SCf. As shown in FIG. 19, the registration screen SCf displays an area for displaying the name and price of the purchased commodity and the amount for the purchased commodity. In addition, an image of a "accounting" button BTc for instructing accounting is displayed. The consumer causes the lens of the camera 45 to face the barcode attached to the purchased commodity when putting the purchased commodity in a container such as a shopping basket or a shopping cart. Then, the barcode is scanned by the camera 45. The barcode includes the commodity code of the purchased commodity.

The processor 41 that has displayed the registration screen SCf determines whether or not the data code has been read by the camera 45 in ACT 31. In a case where it is determined that the data code has not been read (NO in ACT 31), the processing of the processor 41 proceeds to ACT 32. The processor 41 determines whether or not the "accounting" button BTc has been operated in ACT 32. In a case where it is determined that the "accounting" button BTc has not been operated (NO in ACT 32), the processing of the processor 41 returns to ACT 31. The processor 41 waits for the data code to be read or the "accounting" button BTc to be operated in ACT 31 or ACT 32.

In a case where it is determined that the data code has been read by the camera 45 in the standby state in ACT 31 or ACT 32 (YES in ACT 31), the processing of the processor 41 proceeds to ACT 33. The processor 41 analyzes the data code in ACT 33. The processor 41 determines whether or not the data code is a commodity code in ACT 34. In a case where it is determined that the data code is the commodity code (YES in ACT 34), the processing of the processor 41 proceeds to ACT 35. The processor 41 updates the registration screen SCf in ACT 35.

Specifically, the processor 41 transmits the commodity code to the store system 10 using wireless communication. At this time, in a case where the setting information of the setting item "store LAN flag" associated with the serial number No. 10 of the store setting table 70 is "1", the processor 41 controls the wireless device 46 such that the data of the commodity code is transmitted to the store system 10 via the LAN in the store. In this case, the data of the commodity code is received by the access point 15 and is taken into the virtual POS server 12.

Meanwhile, in a case where the setting information of the setting item "store LAN flag" is "0", the processor 41 controls the communication interface 47 such that the data of the commodity code is transmitted to the store system 10 via the management server 20. In this case, the data of the commodity code is received by the communication server 13 and is taken into the virtual POS server 12.

The virtual POS server 12 that has taken the data of the commodity code obtains the commodity data such as the commodity name and price of the commodity specified by the commodity code from the commodity database of the store server 11. Alternatively, the virtual POS server 12 obtains the commodity data from a local commodity database in a case where the commodity database of the store server 11 has been copied to the virtual POS server 12. The virtual POS server 12 generates sales data of the purchased commodity on the basis of the obtained commodity data and registers the generated sales data in the commodity registration table in which the program ID of the shopping support apparatus 40 is set. Further, the virtual POS server 12 generates data of the registration screen SCf on the basis of the data registered in the commodity registration table, and transmits the generated data of the registration screen SCf to the shopping support apparatus 40. The data of the registration screen SCf is transmitted via the access point 15 again in a case where the setting information of the setting item "store LAN flag" is "1". In a case where the setting information of the setting item "store LAN flag" is "0", the data of the registration screen SCf is transmitted to the communication terminal through the management server 20. Thus, the processor 41 of the shopping support apparatus 40 updates the registration screen SCf displayed on the touch panel 44. The processor 41 that has updated the registration screen SCf returns to the standby state in ACT 31 or ACT 32.

By the way, in a case where the purchased commodity is one of the R-20 restricted products, the processor 41 performs processing according to the data of the setting item associated with the serial number No. 31, i.e., the R-20 product force flag. Specifically, in a case where the R-20 product force flag is "0", the processor 41 displays a pop-up image of a message instructing prohibition of registration of R-20 products on the registration screen. In a case where the R-20 product force flag is "1", the processor 41 does not display the pop-up image. It should be noted that the virtual POS server 12 may control whether or not to display the pop-up image.

When the consumer finishes shopping, the consumer touches the "accounting" button BTc on the registration screen SCf. In a case where it is determined that the "accounting" button BTc has been operated on the basis of the signal from the touch panel 44 (YES in ACT 32), the processing of the processor 41 proceeds to ACT 41 of FIG. 9. In ACT 41, the processor 41 displays an accounting screen SCg (see FIG. 20) on the touch panel 44.

Figure 20:
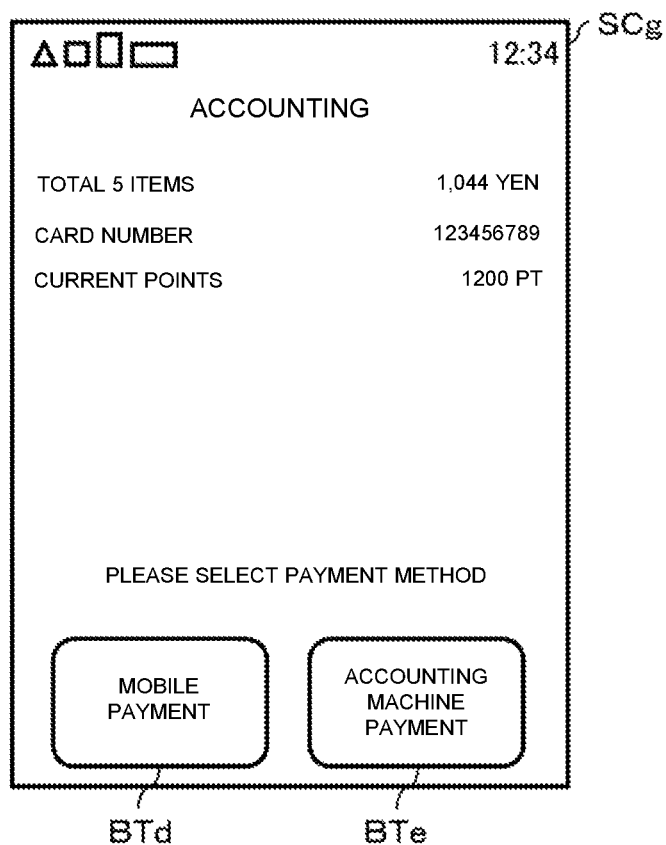
FIG. 20 is a diagram showing an example of an accounting screen.

FIG. 20 is an example of the accounting screen SCg. As shown in FIG. 20, the total number of purchased commodities and the total amount are displayed on the accounting screen SCg. The total number of purchased commodities and the total amount are values calculated on the basis of the data of the commodity registration table in which the program ID of the shopping support apparatus 40 is set in the virtual POS server 12. A button BTd for selecting mobile payment and a button BTe for selecting accounting machine payment are displayed on the accounting screen SCg as payment methods. It should be noted that in a case where the value of the setting item "mobile payment flag" corresponding to the serial number No. 30 is "0", i.e., in a case where the store entry data code 51 of a store that does not employ the mobile payment has been read, the button BTd is not displayed. Alternatively, the button BTd is deactivated. Further, only in a case where the card number of the point card has been registered in the shopping support apparatus 40, the card number and the accumulated points up to the present are displayed on the accounting screen SCg.

The consumer who has confirmed the accounting screen SCg touches the button BTd when paying for the purchased commodity by the mobile payment. The consumer who makes a payment by the use of the accounting machine 14 touches the button BTe.

The processor 41 that has controlled the display of the accounting screen SCg waits for the mobile payment to be selected or the accounting machine payment to be selected in ACT 42. That is, the processor 41 determines whether the button BTd is operated or the button BTe is operated. In a case where it is determined that the button BTe has been operated, i.e., in a case where it is determined that the accounting machine payment has been selected (YES in ACT 42), the processing of the processor 41 proceeds to ACT 43. The processor 41 executes accounting machine payment processing in ACT 43. On the other hand, in a case where it is determined that the button BTd has been operated, i.e., in a case where it is determined that the mobile payment has been selected (NO in ACT 42), the processing of the processor 41 proceeds to ACT 44. The processor 41 performs mobile payment processing at ACT 44.

Since both the accounting screen machine payment processing and the mobile payment processing are well-known processing, detailed descriptions thereof will be omitted. It should be noted that in a case where the card number of the point card has been registered in the shopping support apparatus 40, points calculated for the amount for the purchased commodities are added to the accumulated points, for example.

When the accounting screen machine payment processing or the mobile payment processing is completed, the processing of the processor 41 proceeds to ACT 45. In ACT 45, the processor 41 displays a check-out screen SCh (see FIG. 21) on the touch panel 44.

Figure 21:
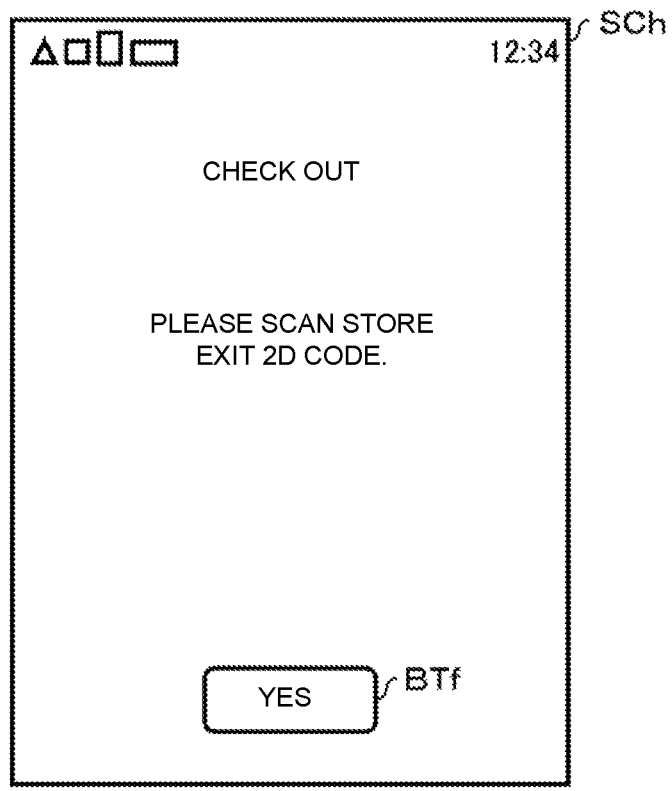
FIG. 21 is a diagram showing an example of a check-out screen.

FIG. 21 shows an example of the check-out screen SCh. As shown in FIG. 21, a message instructing to scan the two-dimensional code for store exit and an image of a "Yes" button BTf are displayed on the check-out screen SCh. The consumer who has confirmed the check-out screen SCh touches the "Yes" button BTf.

The processor 41 displays the camera screen SCb (see FIG. 15) on the touch panel 44 in ACT 46 in a case where it is determined that the "Yes" button BTf on the check-out screen SCh has been operated on the basis of the signal from the touch panel 44. The consumer who has confirmed the camera screen SCb causes the lens of the camera 45 incorporated in the shopping support apparatus 40 to face the store exit data code 52 such that the store exit data code 52 prepared at the exit of the store falls within the reading area ARa.

The processor 41 that has displayed the camera screen SCb waits for the data code in the two-dimensional code system to be read by the camera 45 while determining whether or not the data code in the two-dimensional code system has been read by the camera 45 in ACT 47. As shown in FIG. 16, when the data code in the two-dimensional code system falls within the reading area ARa, it is determined that the data code has been read (YES in ACT 47), and the processing of the processor 41 proceeds to ACT 48.

In ACT 48, the processor 41 analyzes the data coded by the data code from the image of the data code captured by the camera 45. In ACT 49, the processor 41 determines whether or not the read data code is the store exit data code 52 by determining whether the store entry flag of the read data code is "0".

In a case where it is determined that the data code read by the camera 45 is other than the store exit data code 52 (NO in ACT 49), the processing of the processor 41 returns to ACT 47. The processor 41 waits for the camera 45 to read the data code in the two-dimensional code system again.

In a case where it is determined that the store entry flag of the data code read by the camera 45 is "0" as the store exit data code 52 (YES in ACT 49), the processing of the processor 41 proceeds to ACT 50. In ACT 50, the processor 41 checks the company code and the store code of the setting information stored in the third field 73 of the store setting table 70 against the company code and the store code of the setting information obtained by analyzing the store exit data code 50. In ACT 51, the processor 41 then determines whether the company codes and the store codes of both match.

In a case where it is determined that the company codes and the store codes of both do not match (NO in ACT 51), the processing of the processor 41 proceeds to ACT 52. In ACT 52, the processor 41 reports a store exist error. For example, the processor 41 displays a store exit error screen SCi (see FIG. 22) on the touch panel 44 to notify the consumer of the store exit error.

Figure 22:
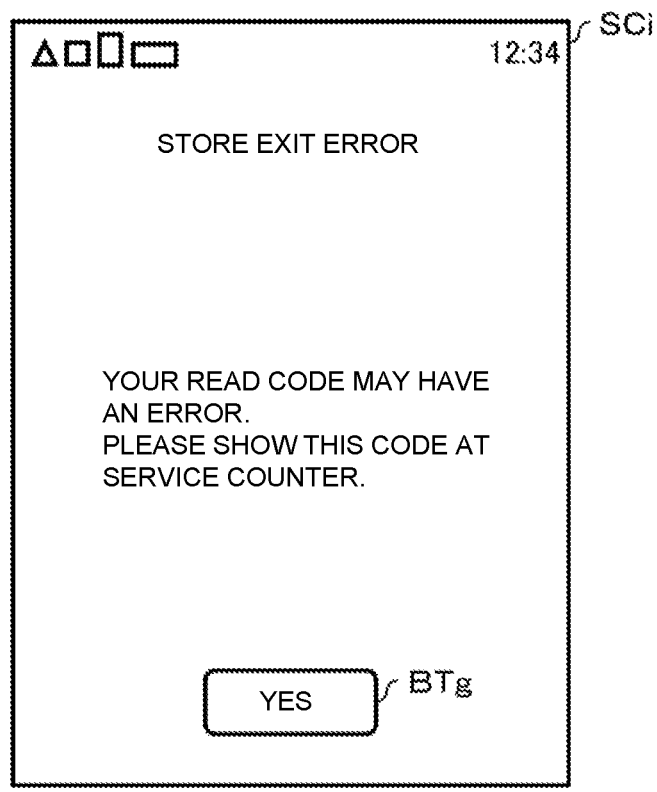
FIG. 22 is a diagram showing an example of an exit error screen.

FIG. 22 shows an example of the store exit error screen SCi. As shown in FIG. 22, a message for notifying that there is an error in the code read by the shopping support apparatus 40 and an image of a "Yes" button BTg for designating consumer's confirmation of the message are displayed on the store exit error screen SCi. When the processor 41 detects that the "Yes" button BTg has been operated, the processor 41 terminates the information processing shown in the flowchart of FIG. 9.

The fact that the company codes and the store codes of both do not match means that the consumer has read the store exit data code 52 of a store different from the store of the store entry data code 51 read when entering the store. That is, this means that the consumer does not read the store exit data code 52 at the store visited last time, but reads the store exit data code 52 instead of the store entry data code 51 at the store visited this time. For this reason, in the shopping support system 1, the store exit error is reported to disable the use of the shopping support apparatus 40.

Figure 9:
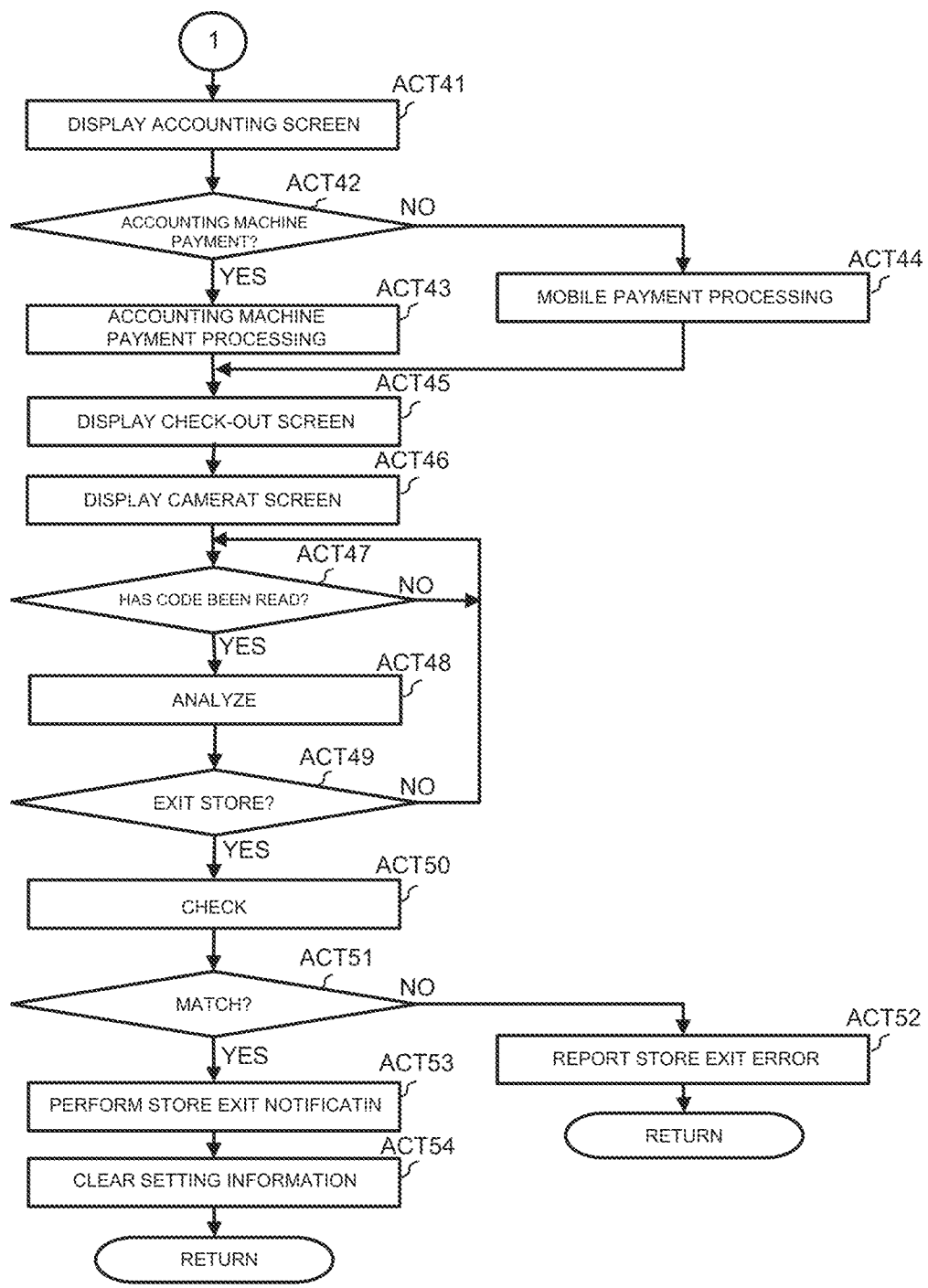
FIG. 9 is a flowchart showing the purchase mode processing in FIG. 7.

Now, the description of FIG. 9 will be continued. In a case where it is determined that the company codes and the store codes of both match (YES in ACT 51), the processing of the processor 41 proceeds to ACT 53. In ACT 53, the processor 41 controls the wireless device 46 to transmit the store exit notification command to the management server 20. By this control, the store exit notification command is transmitted from the wireless device 46. The store exit notification command is received by the access point 15 via the store LAN, transmitted to the network 30 from the communication server 13, and received by the communication interface 25 of the management server 20. The store exit notification command includes the program ID of the shopping support program 60 and the company code and the store code written in the third field 73 of the store setting table 70.

When receiving the store exit notification command via the communication interface 25, the processor 21 of the management server 20 starts store exit notification reception processing shown in the flowchart of FIG. 11. In ACT 71, the processor 21 obtains the program ID, the company code, and the store code from the store exit notification command.

In ACT 72, the processor 21 retrieves the history file 231 by the use of the program ID, the company code, and the store code. In ACT 73, the processor 21 determines whether or not the unaccounted record is present by checking whether or not a record in which the program ID, the company code, and the store code match exists in the history file 231. Specifically, the processor 21 first checks whether or not there is a record in which the program ID, the company code, and the store code match. If there are no such records (NO in ACT 73), the processor 21 determines that the unaccounted record is absent.

In a case where it is determined that there is a record in which the program ID, the company code, and the store code match, the processor 21 checks whether or not the store exit date and time are written in a store exit date and time field of the record. When it is checked that the store exit date and time are written, the processor 21 determines that the unaccounted record is absent. On the other hand, in a case where it is determined that the store exit date and time are not written, the processor 21 determines that the unaccounted record is present.

In a case where it is determined that the unaccounted record is absent (NO in ACT 73), the processor 21 terminates the store exit notification reception processing shown in the flowchart of FIG. 11.

In a case where the unaccounted record is present (YES in ACT 73), the processing of the processor 21 proceeds to ACT 74. In ACT 74, the processor 21 detects the date and time counted by the clock 24 as the store exit date and time. In ACT 75, the processor 41 then writes the store exit date and time in the store exit date and time field of the record in which the program ID, the company code, and the store code match. Thus, the processor 41 terminates the store exit notification reception processing shown in the flowchart of FIG. 11.

Now, the description of FIG. 9 will be continued. In ACT 54, the processor 41 that has controlled the transmission of the store exit notification command clears the setting information written in the third field 73 of the store setting table 70. Thus, the processor 41 terminates the purchase mode processing shown in the flowchart of FIG. 9.

Now, the description of FIG. 8 will be continued. Under the standby state in ACT 31 or ACT 32, the consumer may read the store exit data code 52 without operating the "accounting" button BTc. In a case where it is determined that the data code read by the camera 45 is not a commodity code (NO in ACT 34), the processing of the processor 41 proceeds to ACT 36. In ACT 36, the processor 41 determines whether or not the store exit data code 52 has been read. In a case where it is determined that the store exit data code 52 has been read (YES in ACT 36), the processing of the processor 41 proceeds to ACT 37. The processor 41 provides a unaccounted warning in ACT 37. For example, the processor 41 displays an unaccounted warning screen SCj (see FIG. 23) on the touch panel 44 to warn the consumer that the accounting has not been completed. In addition, the processor 41 controls the wireless device 46 to transmit a warning signal to the store server 11 in ACT 38. By this control, the warning signal is wirelessly transmitted from the wireless device 46. The warning signal is transmitted via the wireless LAN, received by the access point 15, and transmitted to the store server 11. The store server 11 that has received the warning signal outputs the warning signal to a client terminal, which is operated by the store clerk, for example, to provide the unaccounted warning through the client terminal. On the other hand, in a case where it is determined that the store exit data code 52 has not been read (NO in ACT 36), the processor 41 performs other processing.

Figure 23:
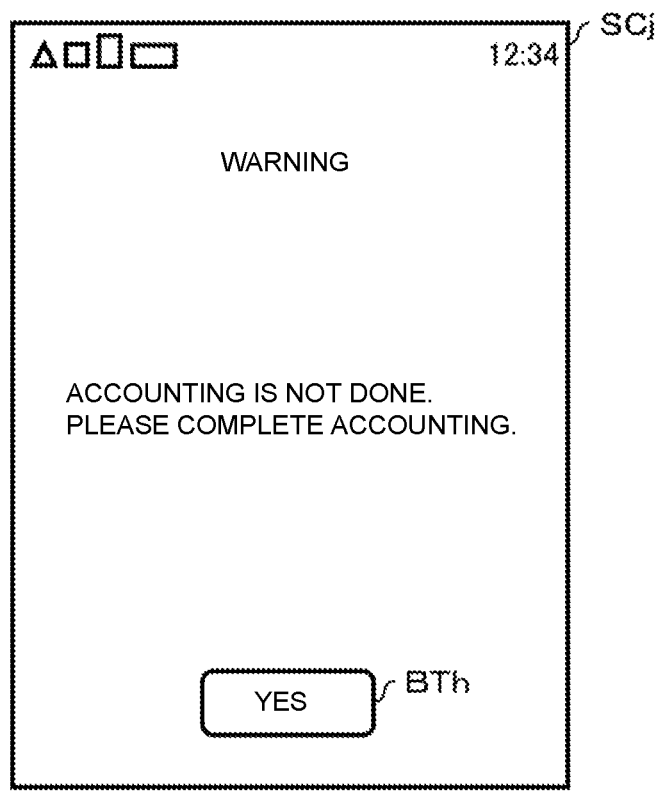
FIG. 23 is a diagram showing an example of an unaccounted error screen.

FIG. 23 shows an example of the unaccounted warning screen SCj. As shown in FIG. 23, a message for warning that the accounting has not been completed and an image of a "Yes" button BTh for designating consumer's confirmation of the message are displayed on the unaccounted warning screen SCj.

As described above, the unaccounted warning screen SCj is displayed to the consumer who has read the store exit data code 52 without operating the "accounting" button BTc and the store clerk is provided with the unaccounted warning. Therefore, the consumer who has confirmed the unaccounted warning screen SCj touches the "Yes" button BTh to returns to the registration screen SCf, and touches the "accounting" button BTc.

When detecting that the "Yes" button BTh on the unaccounted warning screen SCj has been operated, the processor 41 that has controlled the transmission of the warning signal returns to the standby state in ACT 31 or ACT 32.

Figure 12:
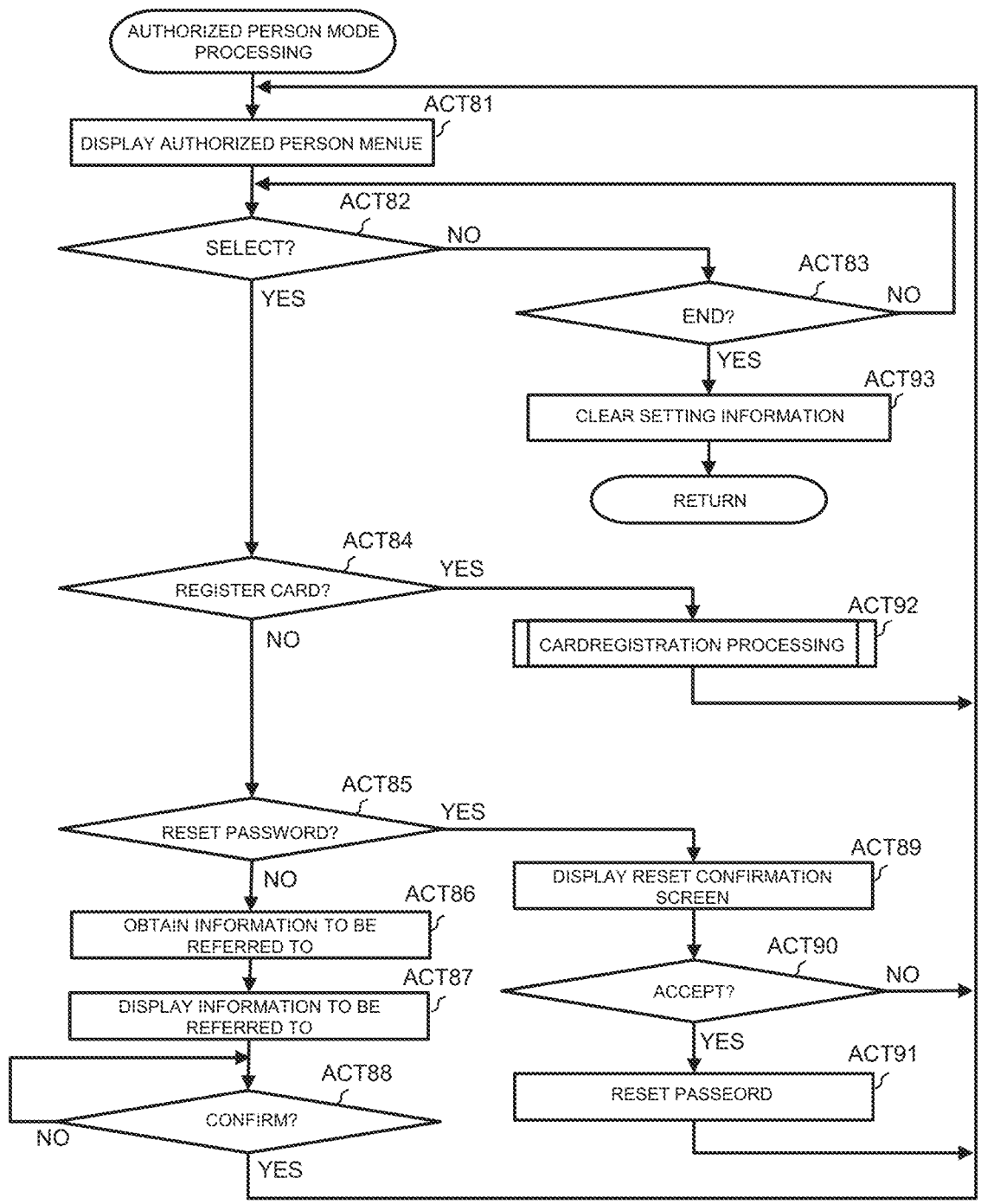
FIG. 12 is a flowchart showing authorized person mode processing in FIG. 7.
Figure 24:
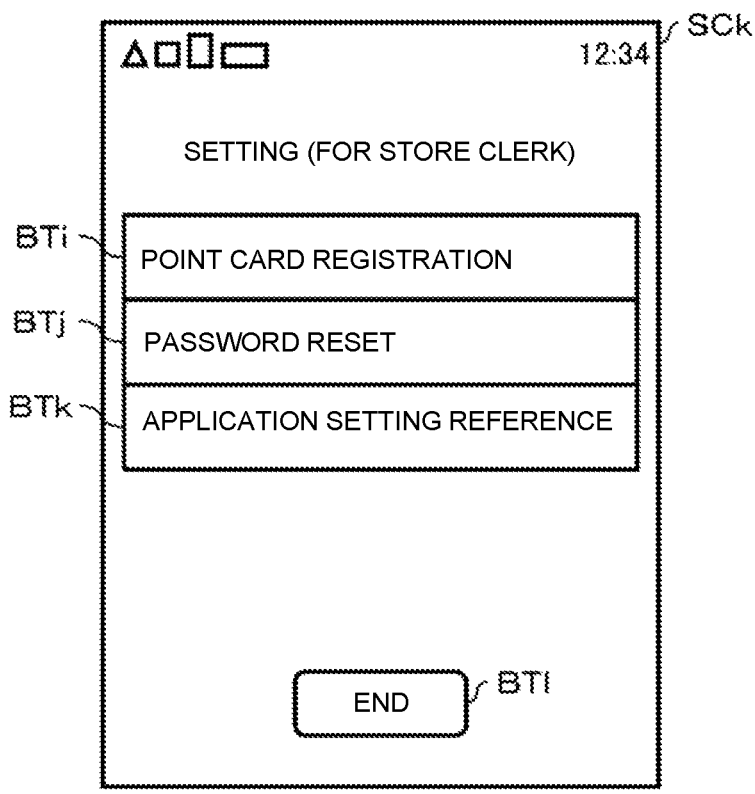
FIG. 24 is a diagram showing an example of an authorized person menu screen.

Next, the procedure of the authorized person mode processing will be described with reference to FIGS. 12 and 13. When the control mode enters the authorized person mode processing, the processor 41 displays an authorized person menu screen SCk (see FIG. 24) on the touch panel 44 in ACT 81. FIG. 24 shows an example of the authorized person menu screen SCk. As shown in FIG. 24, images of three task selecting buttons BTi, BTj, and BTk are displayed on the authorized person menu screen SCk. An image of an "end" button BTl is also displayed.

The task selecting button BTi is a button for selecting a point card registration task. The point card registration task is a task of registering the card number of the point card issued to the consumer in the shopping support apparatus 40 used by the consumer. In the shopping support system 1, the execution of this type of task is restricted only to the authorized person. The authorized person is, for example, a store clerk at a service counter. That is, the point card registration task is a part of the authorized person menu and can be selected on the authorized person menu screen SCk.

The task selecting button BTj is a button for selecting a password reset task. The password reset task is a task for resetting the password retained in the shopping support apparatus 40. The password is used for user authentication, for example, in credit card payment or mobile payment. If the user enters the password a predetermined number of times and enters the password incorrectly, the password is locked. The password reset task is a task for resetting the locked password and unlocking the locked state. In the shopping support system 1, the execution of this type of task is restricted only to the authorized person. The authorized person is, for example, a store clerk at a service counter. In other words, the password reset task is a part of the authorized person menu and can be selected on the authorized person menu screen SCk.

The task selecting button BTk is a button for selecting an application setting reference task. The application setting reference task is referring to predetermined information related to the shopping support program stored in the shopping support apparatus 40. The predetermined information includes, for example, the program ID, the password, the log data, and the like of the shopping support program. In the shopping support system 1, the execution of this type of task is restricted only to the authorized person. The authorized person is, for example, a store clerk at a service counter. In other words, the application setting reference task is a part of the authorized person menu and can be selected on the authorized person menu screen SCk.

The authorized person who has confirmed the authorized person menu screen SCk touches the selection button for the task to be executed. For example, for executing the point card registration task, the authorized person touches the task selecting button BTi. For example, for executing the password reset task, the authorized person touches the task selecting button BTj. For example, for executing the application setting reference task, the authorized person touches the task selecting button BTk. For terminating the task of the authorized person menu, the authorized person touches the "end" button BTl.

In ACT 82, the processor 41 determines whether or not any of the task selecting buttons BTi to BTk has been selected. In a case where it is determined that the task selecting buttons BTi to BTk have not been selected (NO in ACT 82), the processing of the processor 41 proceeds to ACT 83. The processor 41 determines whether or not the "end" button BTl is operated as an input in ACT 83. In a case where it is determined that the "end" button BTl is not operated (NO in ACT 83), the processing of the processor 41 returns to ACT 82. Here, the processor 41 waits for the task selecting buttons BTi to BTk to be selected or for the "end" button BTl to be manipulated in ACT 82 and ACT 83.

In a case where it is determined that the task selecting buttons BTi to BTk are selected on the basis of the signal from the touch panel 44 (YES in ACT 82), the processing of the processor 41 proceeds to ACT 84. The processor 41 determines whether or not the selected button is the task selecting button BTi (selection button of the point card registration task) in ACT 84. In a case where it is determined that the selected button is not the task selecting button BTi (NO in ACT 84), the processing of the processor 41 proceeds to ACT 85. The processor 41 determines whether or not the selected button is the task selecting button BTj (button for selecting the password reset task) in ACT 85. In a case where it is determined that the selected button is not the task selecting button BTj (NO in ACT 85), the processing of the processor 41 proceeds to ACT 86.

In a case where the selected button is neither the task selecting button BTi nor the task selecting button BTj, the selected button is the task selecting button BTk (button for selecting the application setting reference task). In ACT 86, the processor 41 obtains information to be referred to in the application setting reference task, for example, the program ID, the password, the log data, and the like, from the built-in memory 42 or the external memory 43. In ACT 87, the processor 41 displays the information obtained from the shopping support apparatus 40 on the touch panel 44. At this time, the touch panel 44 also displays an image of a confirmation button for designating authorized person's confirmation.

The processor 41 waits for the confirmation button to be operated in ACT 88. In a case where it is determined that the confirmation button has been operated (YES in ACT 88) on the basis of the signal from the touch panel 44 (YES in ACT 88), the processing of the processor 41 returns to ACT 81. That is, the processor 41 displays the authorized person menu screen SCk again as the screen of the touch panel 44.

In a case where it is determined that the task selecting button BTj is selected in the standby state in ACT 82 or ACT 83 (YES in ACT 85), the processing of the processor 41 proceeds to ACT 89. In ACT 89, the processor 41 displays a reset confirmation screen SCl (see FIG. 25) on the touch panel 44.

Figure 25:
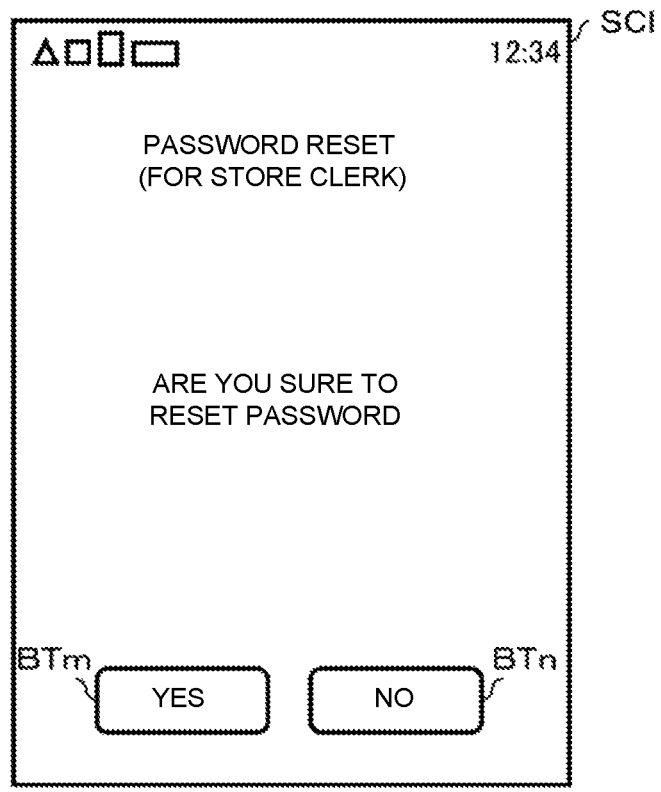
FIG. 25 is a diagram showing an example of a reset confirmation screen.

FIG. 25 shows an example of the reset confirmation screen SCl. As shown in FIG. 25, a message for confirming whether or not to reset the password, an image of a "Yes" button BTm to be operated by the authorized person when executing the password reset, and a "No" button BTn to be operated by the authorized person when canceling the execution are displayed on the reset confirmation screen SCl.

The authorized person who has confirmed the reset confirmation screen SCl touches the "Yes" button BTm to execute the password reset. The authorized person touches the "No" button BTn not to execute the password reset.

In ACT 90, the processor 41 waits for the "Yes" button BTm to be operated or the "No" button BTn to be operated. In a case where it is determined that the "Yes" button BTm is operated (accepted) on the basis of the signal from the touch panel 44 (YES in ACT 90), the processing of the processor 41 proceeds to ACT 91. In ACT 91, the processor 41 resets the password stored in the built-in memory 42 or the external memory 43 of the shopping support apparatus 40. The processing of the processor 41 then returns to ACT 81. That is, the processor 41 displays the authorized person menu screen SCk again as the screen of the touch panel 44.

In a case where it is determined that the "No" button BTn has been operated (not accepted) on the basis of the signal from the touch panel 44 (NO in ACT 90), the processing of the processor 41 skips ACT 91 and returns to ACT 81. That is, the processor 41 displays the authorized person menu screen SCk again as the screen of the touch panel 44.

In a case where the task selecting button BTi is selected in the standby state in ACT 82 or ACT 83 (YES in ACT 84), the processing of the processor 41 proceeds to ACT 92. The processor 41 executes the card registration processing in ACT 92.

Figure 13:
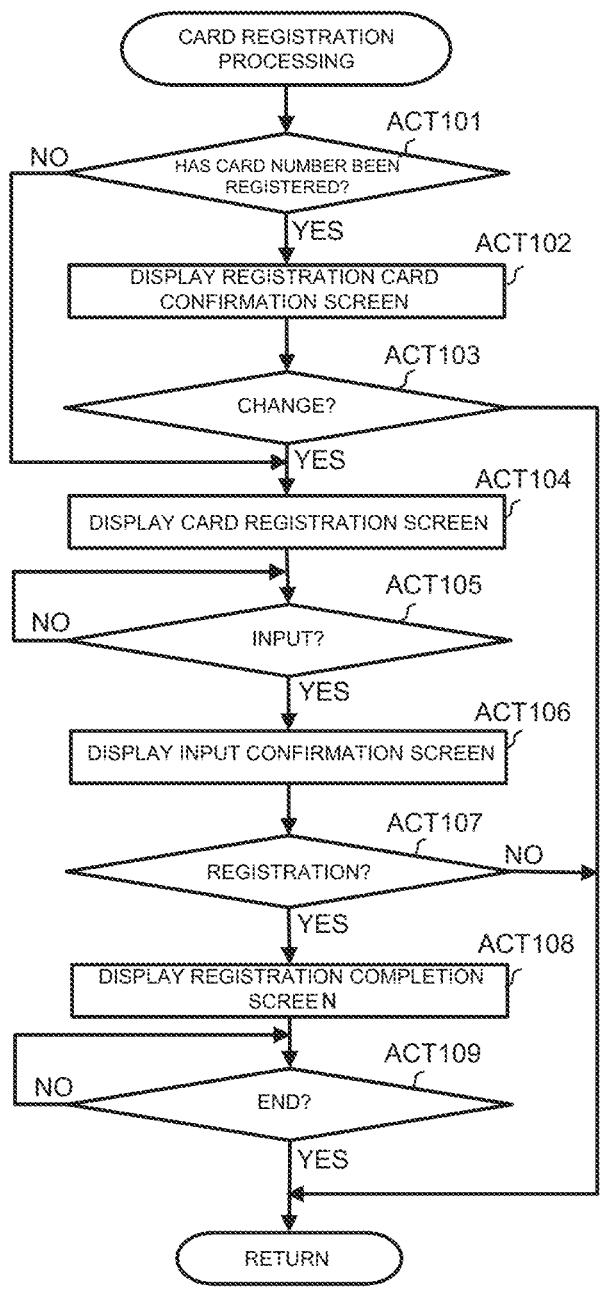
FIG. 13 is a flowchart showing card registration processing in FIG. 12.

FIG. 13 is a flowchart showing the card registration processing. The processor 41 that has started the card registration processing determines whether or not the card number of the point card has been registered in the shopping support apparatus 40 in ACT 101. In a case where it is determined that the card number has been registered (YES in ACT 101), the processing of the processor 41 proceeds to ACT 102. In ACT 102, the processor 41 displays a registration card confirmation screen SCm (see FIG. 26) on the touch panel 44.

Figure 26:
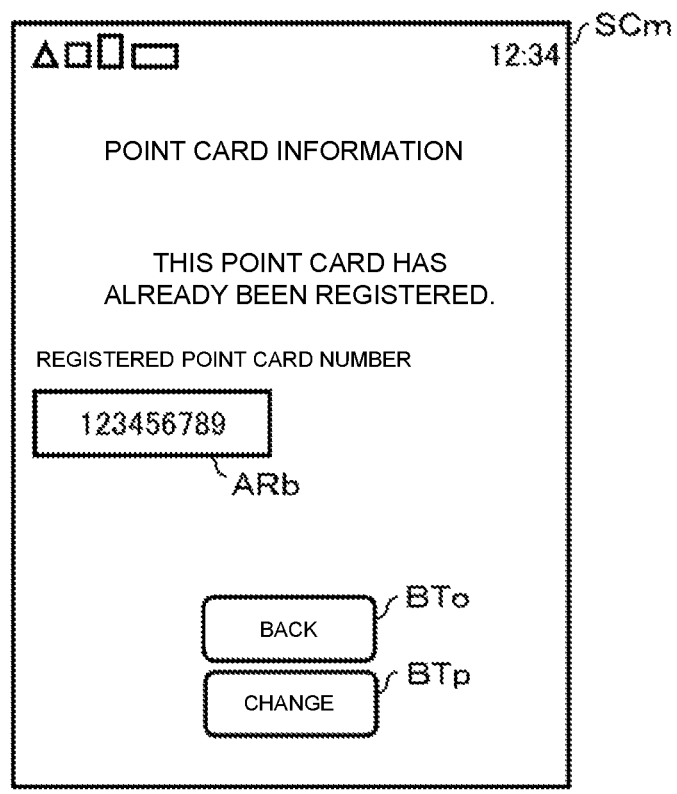
FIG. 26 is a diagram showing an example of a registration card confirmation screen.

FIG. 26 shows an example of the registration card confirmation screen SCm. As shown in FIG. 26, the card number of the point card obtained from the shopping support apparatus 40 is displayed in a display area ARb on the registration card confirmation screen SCm. Images of a "back" button BTo and a "change" button BTp are also displayed. The authorized person touches the "back" button BTo not to change the card number of the point card to be registered in the shopping support apparatus 40. the authorized person touches the "change" button BTp to change the card number.

The processor 41 waits for the "back" button BTo to be operated or the "change" button BTp to be operated in ACT 103. In a case where it is determined that the "back" button BTo has been operated on the basis of signal from the touch panel 44 (NO in ACT 103), the processor 41 terminates the card registration processing shown in the flowchart of FIG. 13.

In a case where it is determined that the "change" button BTo has been operated on the basis of the signal from the touch panel 44 (YES in ACT 103), the processing of the processor 41 proceeds to ACT 104.

On the other hand, in a case where it is determined that the card number of the point card has not been registered in the shopping support apparatus 40 (NO in ACT 101), the processing of the processor 41 skips ACT 102 and ACT 103 and proceeds to ACT 104. In ACT 104, the processor 41 displays a card registration screen SCn (see FIG. 27) on the touch panel 44.

Figure 27:
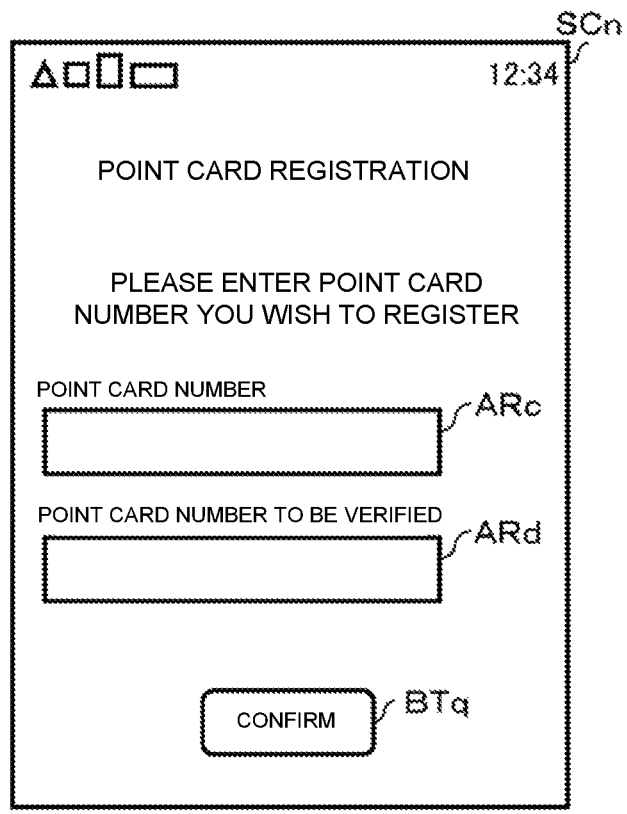
FIG. 27 is a diagram showing an example of a card registration screen.

FIG. 27 shows an example of the card registration screen SCn. As shown in FIG. 27, areas ARc and ARd for inputting the card number of the point card are displayed on the card registration screen SCn. Also, an image of the "confirm" button BTq is displayed. The authorized person inputs the card number into the areas ARc and ARd by operating a ten-key pad of the touch panel 44.

It should be noted that the card registration screen SCn is a screen in a case where the value of the setting item "point card input mode" corresponding to the serial number No. 32 of the store setting table 70 is "1", i.e., the first mode to manually input the card number of the point card has been designated. In a case where the value of the setting item "point card input mode" is "2", i.e., the second mode to read the card number of the point card by the camera 45 has been designated, an image showing the reading area of the camera 45 is displayed as the card registration screen SCn.

The processor 41 waits for the card number to be entered in ACT 105 of FIG. 13. When the card number is entered through the touch panel 44 or the camera 45, the processor 41 displays the input confirmation screen SCo (see FIG. 28) on the touch panel 44 in ACT 106.

Figure 28:
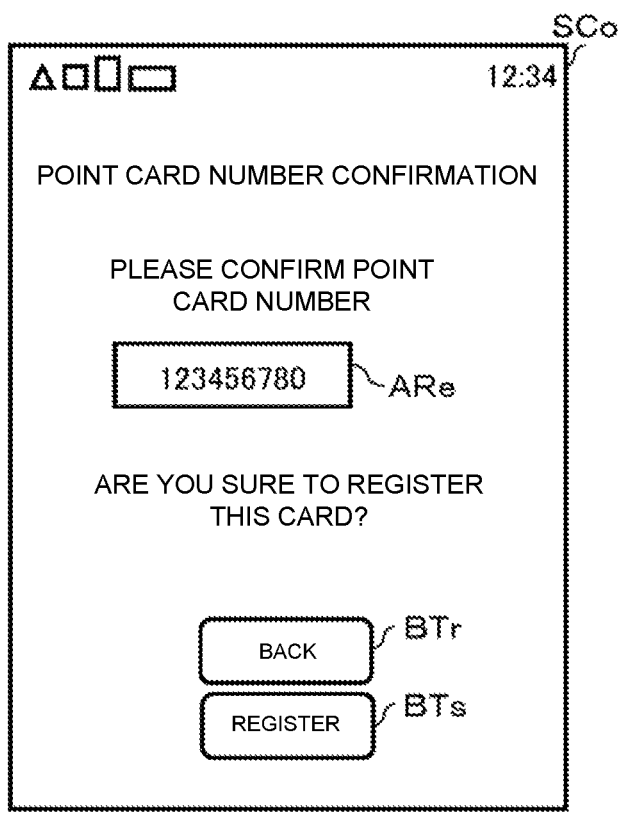
FIG. 28 is a diagram showing an example of an input confirmation screen.

FIG. 28 shows an example of the input confirmation screen SCo. As shown in FIG. 28, a display area ARe of the card number entered through the touch panel 44 or the camera 45 is displayed on the input confirmation screen SCo. Images of a "back" button BTr and a "register" button BTs are also displayed. The authorized person touches the "back" button BTr to stop the registration of the card number displayed in the display area ARe. The authorized person touches the "register" button BTs to register the card number in the shopping support apparatus 40.

The processor 41 waits for the "back" button BTr to be operated or the "register" button BTs to be operated in ACT 107 of FIG. 13. In a case where it is determined that the "back" button BTr has been operated on the basis of signal from the touch panel 44 (NO in ACT 107), the processor 41 terminates the card registration processing shown in the flowchart of FIG. 13.

In a case where it is determined that the "register" button BTs has been operated on the basis of signal from the touch panel 44 (YES in ACT 107), the processing of the processor 41 proceeds to ACT 108. In ACT 108, the processor 41 displays a registration completion screen SCp (see FIG. 29) on the touch panel 44.

Figure 29:
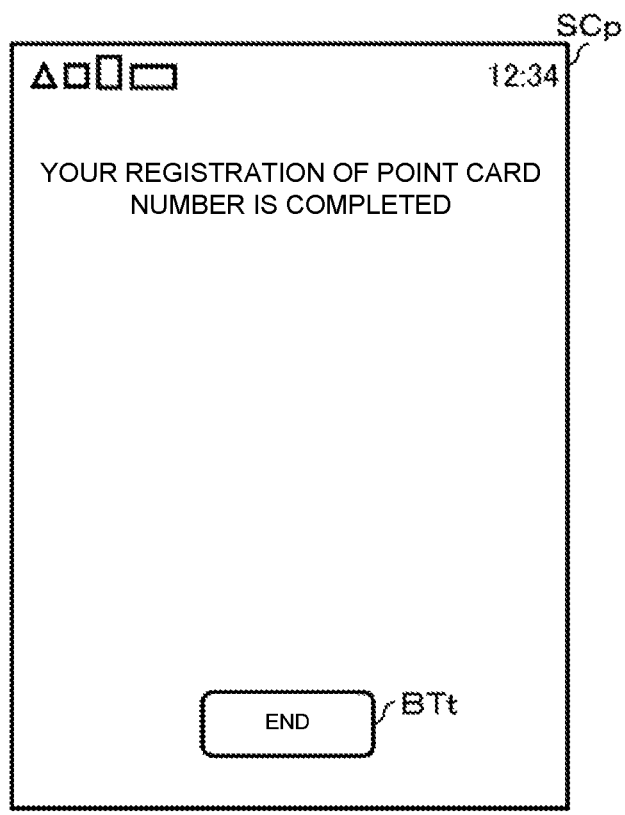
FIG. 29 is a diagram showing an example of a registration completion screen.

FIG. 29 shows an example of the registration completion screen SCp. As shown in FIG. 29, a message notifying that registration of the card number has been completed and an image of an "end" button BTt are displayed on the registration completion screen SCp. The authorized person who has confirmed the message touches the "end" button BTt.

The processor 41 waits for the "end" button BTt to be operated in ACT 109 of FIG. 13. In a case where it is determined on the basis of signal from the touch panel 44 that the "end" button BTt has been operated (YES in ACT 109), the processor 41 terminates the card registration processing shown in the flowchart of FIG. 13. When the card registration processing is completed, the processing of the processor 41 returns to ACT 81. That is, the processor 41 displays the authorized person menu screen SCk again as the screen of the touch panel 44.

In a case where it is determined that the "end" button BTl has been operated in the standby state in ACT 82 or ACT 83 (YES in ACT 83), the processing of the processor 41 proceeds to ACT 93. The processor 41 clears the setting information written in the third field 73 of the store setting table 70 in ACT 93. Thus, the processor 41 terminates the authorized person mode processing shown in the flowchart of FIG. 13.

Figure 7:
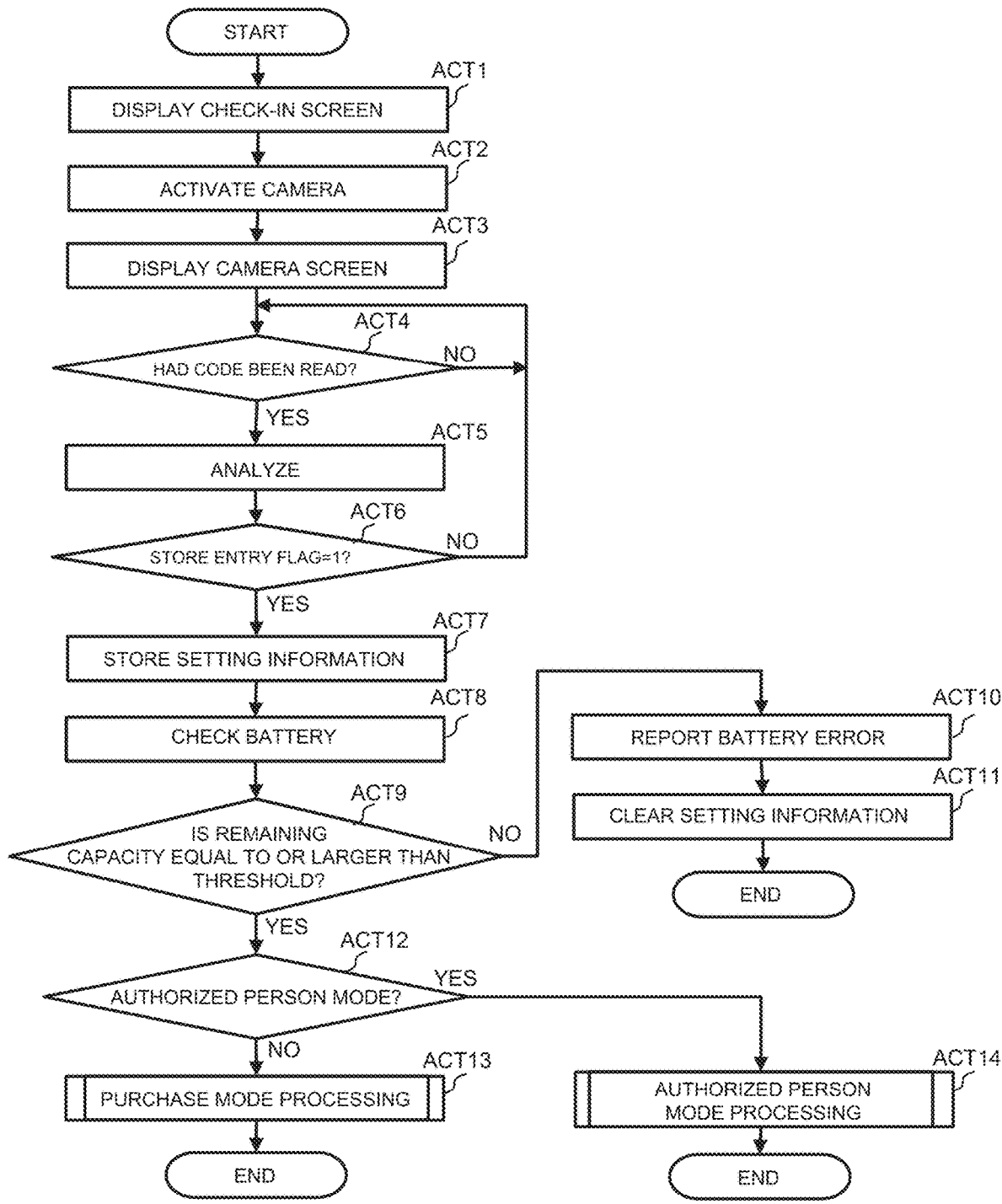
FIG. 7 is a flowchart showing information processing executed by a processor of the shopping support apparatus on the basis of the shopping support program.

As described above, the processor 41 of the shopping support apparatus 40 configures an obtaining means by executing the processing of ACT 1 to ACT 5 of FIG. 7. That is, the processor 41 reads the store entry data code 51 or the store setting data code 53 by the camera 45, to thereby obtain the store-specific setting information from the store entry data code 51 or the store setting data code 53.

The processor 41 cooperates with the store setting table 70 to execute the processing of ACT 7 of FIG. 7, to thereby configure a storage means. That is, the processor 41 writes and stores the setting information obtained by the obtaining means in the third field 73 of the store setting table 70.

The processor 41 configures a determination means by executing the processing of ACT 12 of FIG. 7. That is, the processor 41 determines whether the control mode is the first mode for shopping support in the store, i.e., the purchase mode, or the second mode for the task restricted to the operation of the authorized person, i.e., the authorized person mode, on the basis of the authorized person mode flag of the setting information obtained by the obtaining means.

The processor 41 configures a first control means by executing the processing of ACT 13 of FIG. 7. That is, the processor 41 controls the shopping support operation according to the shopping support program on the basis of the setting information obtained by the obtaining means.

The processor 41 configures a second control means by executing the processing of ACT 14 of FIG. 7. That is, the processor 41 controls the execution of tasks restricted to the operations of the authorized person.

According to the shopping support apparatus 40 having such a configuration, it is possible to easily switch between an operation to be used by the consumer in shopping support and an operation in which the operation is restricted to the authorized person. That is, when the consumer reads the store entry data code 51 prepared at the entrance of the store by the camera of the shopping support apparatus 40, the shopping support apparatus 40 functions to perform the operation to be used in shopping support. On the other hand, when the store clerk reads the store setting data code 53 prepared at the service counter or the like by the camera of the shopping support apparatus 40, the shopping support apparatus 40 functions to perform the operation in which the operation is restricted to the authorized person. As a result, only the authorized person can perform the task restricted to the operation of the authorized person, such as the point card registration task, the password reset task, and the application setting reference task. Therefore, it is possible to prevent improprieties such as, for example, the consumer registering the card number of the point card illegally.

By the way, the shopping support apparatus 40 can easily switch between the operation to be used by the consumer in shopping support and the operation in which the operation is restricted to the authorized person by simply reading the store entry data code 51 or the store setting data code 53 in the same code system. Therefore, a complicated operation for switching the operation is unnecessary, such that the operability is excellent.

In addition, the shopping support apparatus 40 switches the operation according to the information included in the read data code, i.e., the status of the authorized person mode flag. Therefore, since the information processing until the operation is determined is simple, it is possible to reduce the processing load of the processor 41 mounted on the shopping support apparatus 40.

When the shopping support apparatus 40 terminates the execution of the task restricted to the operation of the authorized person, the shopping support apparatus 40 clears the setting information stored in the third field 73 of the store setting table 70. Therefore, after the store clerk has entrusted the shopping support apparatus 40 from the consumer and has executed the task restricted to the operation of the authorized person, the shopping support apparatus 40 cannot be used as it is for shopping. In order to use the shopping support apparatus 40 for shopping, an operation for reading the store entry data code 51 is required. Therefore, unauthorized use of the store clerk can be also prevented.

Although the embodiment of the shopping support apparatus 40 has been described above, the embodiment is not limited to thereto.

In the above embodiment, when the processor 41 of the shopping support apparatus 40 starts the authorized person mode processing, the authorized person menu screen SCk is displayed on ACT 81. Regarding this point, the processing of reading a store clerk code is added before displaying the authorized person menu screen SCk. By this processing, when the store clerk code of the store clerk registered in advance as the authorized person is read, the shopping support program is changed so as to display the authorized person menu screen SCk. By doing so, it is possible to prevent a person other than the authorized person from reading the store setting data code 53 by the camera of the shopping support apparatus 40 and illegally executing the task restricted to the operation of the authorized person.

It is needless to say that the task restricted to the operation of the authorized person is not limited to the tasks described in the above embodiment.

In the above embodiment, the items of the setting information coded in the store setting data code 53 are identical to the items of the setting information coded in the store setting data code 51. The items of the setting information coded in the store setting data code 53 only need to include at least items that is identified as the store setting data code 53, i.e., the store entry flag, the authorized person mode flag, and the store identification information, i.e., the company code and the store code. In a case where the shopping support system 1 is configured by a plurality of stores belonging to one company, the company code may be omitted.

In the above embodiment, the program ID of the shopping support program 60 installed in the shopping support apparatus 40 is used as the identification information of the shopping support apparatus 40. The identification information of the shopping support apparatus 40 is not necessarily limited to the program ID of the shopping support program 60. Identification information set in advance for the communication terminal to be used as the shopping support apparatus 40 may be used as the identification information of the shopping support apparatus 40. That is, the IP address, the terminal ID, the telephone number, and the like may be used as the identification information of the shopping support apparatus 40.

In the above embodiment, the data codes 51 to 53 are used as the method of incorporating the information of each setting item written in the third field 73 of the store setting table 70 into the shopping support apparatus 40. The method of incorporating the information into the shopping support apparatus 40 is not limited thereto. For example, in a case where the shopping support apparatus 40 is equipped with a contactless IC card technology, an antenna for short-range wireless communication may be installed in each store and the shopping support apparatus 40 may obtain the information of each setting item by contactless wireless communication.

In the above embodiment, 34 types of setting items are set in the store setting table 70. The types of setting items are not limited thereto. Other setting items may be added. Alternatively, any of the setting items may be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shopping support apparatus that performs a support operation of shopping at a store when a consumer performs shopping at the store, the shopping support apparatus comprising:
    a battery;
    a reader that reads a data code, the data code including a first data code and a second data code, the first data code including first setting information indicating that a control mode is a first mode, the second data code including second setting information indicating that the control mode is a second mode, and the first data code and the second data code both including third setting information indicating a battery check threshold value for checking a remaining capacity of the battery;
    a memory that stores setting information included in the read data code; and
    a processor that performs the following processing of
        when the reader reads the data code, storing the setting information included in the read data code, which includes the third setting information, in the memory, and checking the remaining capacity of the battery by determining whether the remaining capacity is more than the battery check threshold value indicated by the third setting information stored in the memory,
        after checking the remaining capacity of the battery, determining whether the first setting information or the second setting information is stored in the memory,
        performing, in a case where the first setting information is stored in the memory, a task for supporting shopping at the store, and
        performing, in a case where the second setting information is stored in the memory, a task restricted to an operation of an authorized person.

2. The shopping support apparatus according to claim 1, wherein
    the processor deletes the setting information stored in the memory when the processor terminates the second mode.

3. The shopping support apparatus according to claim 2, wherein
    the first data code and the second data code further includes fourth setting information for determining whether or not the consumer enters the store, and
    the processor
    determines whether the consumer has entered the store by referring to the fourth setting information when the reader reads the data code, and
    stores the fourth setting information included in the read data code in the memory when determining the that the consumer has entered the store.

4. The shopping support apparatus according to claim 1, wherein
    the processor, in the second mode, associates identification information of the shopping support apparatus with identification information of a consumer's point card and stores them in the memory.

5. The shopping support apparatus according to claim 1, wherein
    if the remaining capacity of the battery is less than the battery check threshold value, the processor does not perform the task of the first mode.

6. The shopping support apparatus according to claim 5, wherein
    if the remaining capacity of the battery is less than the battery check threshold value, the processor does not perform the tasks of the first mode and second mode.

7. The shopping support apparatus according to claim 5, further comprising a display, and wherein
    the processor displays a message indicating that the remaining capacity of the battery is low on the display.

8. The shopping support apparatus according to claim 1, wherein
    the reader includes a camera that reads the data code by capturing the data code obtained by coding the setting information in a predetermined code system.

9. A shopping support method for a shopping support apparatus including a battery, a reader that reads a data code, the data code including a first data code and a second data code, the first data code including first setting information indicating that a control mode is a first mode, the second data code including second setting information indicating that the control mode is a second mode, and the first data code and the second data code both including third setting information indicating a battery check threshold value for checking a remaining capacity of the battery, and a memory that stores setting information included in the read data code, the shopping support method comprising:
    when the reader reads the data code storing the setting information included in the read data code, which includes the third setting information, in the memory, and checking the remaining capacity of the battery by determining whether the remaining capacity is more than the battery check threshold value indicated by the third setting information stored in the memory;

after checking the remaining capacity of the battery, determining, whether the first setting information or the second setting information is stored in the memory;

performing a task for supporting shopping at a store, if the first setting information is stored in the memory; and performing a task restricted to an operation of an authorized person, if the second setting information is stored in the memory.

\* \* \* \* \*